(12) United States Patent
Nagasawa et al.

(10) Patent No.: US 10,131,276 B2
(45) Date of Patent: Nov. 20, 2018

(54) VEHICLE SIGHTLINE GUIDANCE APPARATUS

(71) Applicant: Fuji Jukogyo Kabushiki Kaisha, Tokyo (JP)

(72) Inventors: Isamu Nagasawa, Tokyo (JP); Keiji Asai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 394 days.

(21) Appl. No.: 14/856,435

(22) Filed: Sep. 16, 2015

(65) Prior Publication Data

US 2016/0090041 A1 Mar. 31, 2016

(30) Foreign Application Priority Data

Sep. 30, 2014 (JP) .................................. 2014-200852
Sep. 30, 2014 (JP) .................................. 2014-200854
(Continued)

(51) Int. Cl.
*B60R 1/00* (2006.01)
*G06K 9/00* (2006.01)
(Continued)

(52) U.S. Cl.
CPC ................ *B60R 1/00* (2013.01); *G01C 11/00* (2013.01); *G02B 27/0101* (2013.01);
(Continued)

(58) Field of Classification Search
CPC ............... B60R 1/00; B60R 2300/804; B60R 2300/8086; G02B 27/0101;
(Continued)

(56) References Cited

U.S. PATENT DOCUMENTS

2007/0279317 A1* 12/2007 Matsumoto ............ B60K 35/00
345/7
2008/0144944 A1* 6/2008 Breed ................ G06K 9/00369
382/224
(Continued)

FOREIGN PATENT DOCUMENTS

JP 2007-263839 A 10/2007
JP 2014-159249 A 9/2014

OTHER PUBLICATIONS

Ejets v.2 Review, Archived Apr. 17, 2014, [online] retrieved from Archive.org on Oct. 12, 2017; https://web.archive.org/web/20140417195442/https://www.avsim.com/pages/1210/feelThere/Ejets.html.*
Chinese Office Action dated Jul. 31, 2018, in corresponding Chinese Patent Application No. 2015-10616906, with an English translation thereof.

*Primary Examiner* — Mark Edwards
(74) *Attorney, Agent, or Firm* — McGinn I.P. Law Group, PLLC

(57) ABSTRACT

A vehicle sightline guidance apparatus includes a display member displaying an image on either one one a see-through windshield and screen that allow a vehicle occupant to visually recognize outside of a vehicle; a scenery-information acquiring unit acquiring scenery information visually recognized by the occupant from inside the vehicle; and a perspective-position specifying unit specifying a perspective position, which is a position on the windshield or screen that a sightline passes when the occupant visually recognizes a predicted path of the vehicle or a position where left and right edges of the predicted path are projected, based on the scenery information. Based on the perspective position, the display member displays two reference marks on the windshield or screen such that the marks are separated from each other by a distance equivalent to a vehicle width or larger and appear to be aligned with the left and right edges.

20 Claims, 16 Drawing Sheets

(30) Foreign Application Priority Data

Sep. 30, 2014 (JP) ................................ 2014-200856
Sep. 30, 2014 (JP) ................................ 2014-200858
Apr. 27, 2015 (JP) ................................ 2015-090424

(51) Int. Cl.
*G01C 11/00* (2006.01)
*G02B 27/01* (2006.01)

(52) U.S. Cl.
CPC .... *G06K 9/00798* (2013.01); *B60R 2300/804* (2013.01); *B60R 2300/8086* (2013.01); *G02B 2027/014* (2013.01); *G02B 2027/0138* (2013.01)

(58) Field of Classification Search
CPC ...... G02B 2027/0138; G02B 2027/014; G06K 9/00798; G01C 11/00
USPC .............................................................. 345/7
See application file for complete search history.

(56) References Cited

U.S. PATENT DOCUMENTS

| | | | |
|---|---|---|---|
| 2008/0186156 A1* | 8/2008 | Uematsu | B60K 35/00 340/441 |
| 2009/0195414 A1 | 8/2009 | Riegel et al. | |
| 2010/0253541 A1* | 10/2010 | Seder | G01S 13/723 340/905 |
| 2012/0224062 A1* | 9/2012 | Lacoste | G01C 21/365 348/148 |
| 2012/0314055 A1* | 12/2012 | Kataoka | G08G 1/167 348/117 |
| 2014/0226015 A1* | 8/2014 | Takatsudo | B60R 1/00 348/148 |
| 2014/0229106 A1* | 8/2014 | Ishikawa | G01C 21/3647 701/533 |

* cited by examiner

VEHICLE SIGHTLINE GUIDANCE APPARATUS

CROSS-REFERENCE TO RELATED APPLICATIONS

The present application claims priority from Japanese Patent Application No. 2014-200852 filed on Sep. 30, 2014, Japanese Patent Application No. 2014-200854 filed on Sep. 30, 2014, Japanese Patent Application No. 2014-200856 filed on Sep. 30, 2014, Japanese Patent Application No. 2014-200858 filed on Sep. 30, 2014, and Japanese Patent Application No. 2015-090424 filed on Apr. 27, 2015, the entire contents of which are hereby incorporated by reference.

BACKGROUND

1. Technical Field

The present invention relates to a sightline guidance apparatus that guides a sightline of a vehicle occupant in a vehicle, such as an automobile.

2. Related Art

Automobiles in recent years are equipped with navigation devices that display guidance routes on liquid crystal displays, as in Japanese Unexamined Patent Application Publication No. 2007-263839, and devices that assist in driving in emergency situations by monitoring the driving environment using various types of radar, as in Japanese Unexamined Patent Application Publication No. 2014-159249.

SUMMARY

However, automobiles still run based on manipulation by vehicle occupants. When driving, a vehicle occupant checks, for instance, safety outside the vehicle through a vehicle window, such as the front windshield, makes a determination on the checked conditions outside the vehicle, and manipulates the automobile accordingly. In this case, running stability of the automobile and safety are basically determined in accordance with the driving ability of the vehicle occupant. In accordance with the conditions, the vehicle occupant drives the automobile while switching his/her line of vision to appropriately check the front side, the diagonally front side, the left and right sides, the rear side, the diagonally rear side, and so on of the vehicle and also while stably maintaining the sightline in a certain direction.

Therefore, for instance, with regard to safety, a novice driver who does not know how to use his/her line of vision for checking the surroundings during driving is required to properly perform a necessary safety check of the outside of the vehicle in a manner similar to an experienced driver. Furthermore, a bus driver who drives in a fatigued state is also required to perform a necessary safety check in a manner similar to a normal non-fatigued vehicle occupant. Moreover, even when a vehicle occupant tries to check outside the vehicle, there may be situations where the check cannot be performed sufficiently due to difficult visibility of the surroundings caused by, for instance, heavy rain. Even in such foul weather conditions, the vehicle occupant is still required to perform a necessary safety check. In other words, even during foul weather, such as heavy rain at night, a novice driver who does not know how to use his/her line of vision during driving is still required to properly perform a necessary safety check and continue driving safely in accordance with the conditions.

Accordingly, a vehicle, such as an automobile, is potentially required to assist in actual driving by the vehicle occupant, as well as present information about a guidance route or assist in driving in an emergency situation.

An aspect of the present invention provides a vehicle sightline guidance apparatus including a display member that displays an image on either one of a see-through front windshield and a see-through screen for allowing a vehicle occupant who has boarded a vehicle to visually recognize outside of the vehicle; a scenery-information acquiring unit that acquires scenery information about scenery visually recognized by the vehicle occupant from inside the vehicle; and a perspective-position specifying unit that specifies a perspective position based on the scenery information, the perspective position being either one of a perspective position on either one of the front windshield and the screen that a sightline passes when the vehicle occupant visually recognizes a predicted path on which the vehicle is predicted to travel and a perspective position where a left edge and a right edge of the predicted path of the vehicle are projected. Based on the perspective position, the display member displays a pair of driving reference marks side-by-side on either one of the front windshield and the screen such that the pair of driving reference marks are separated from each other by a distance equivalent to a vehicle width of the vehicle or larger and appear to be aligned with the left edge and the right edge of the predicted path of the vehicle.

DETAILED DESCRIPTION

Examples of the present invention will be described below with reference to the drawings.

FIRST EXAMPLE

Figure 1:
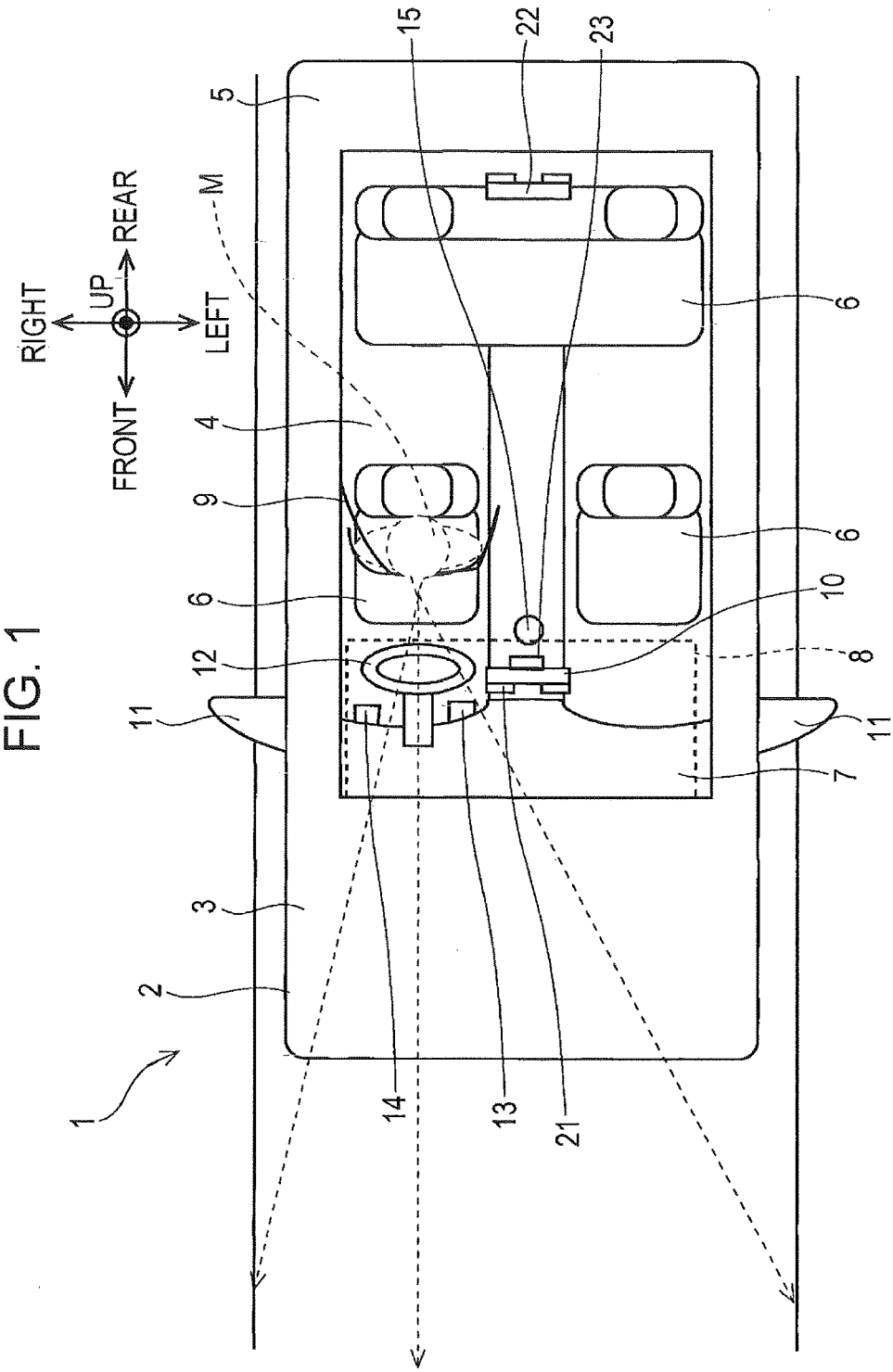
FIG. 1 illustrates an automobile according to a first example of the present invention.

A first example to be described below relates to a case where a pair of driving reference marks for guiding the sightline of a vehicle occupant M are displayed on a front windshield 8. FIG. 1 illustrates an automobile 1 according to the first example of the present invention. The automobile 1 is an example of a vehicle. FIG. 1 is a top view of the automobile 1.

The automobile 1 in FIG. 1 has a vehicle body 2. The vehicle body 2 has a front chamber 3 in which, for instance, an engine is disposed, an occupant chamber 4 that accommodates the vehicle occupant M, and a rear chamber 5 for loading, for instance, a baggage.

In the occupant chamber 4, multiple seats 6 on which vehicle occupants M sit are arranged in two rows at the front and rear sides. A dashboard 7 extending in the left-right direction is disposed in front of the front seats 6. The front windshield 8 is disposed above the dashboard 7. The front windshield 8 is a transparent or semi-transparent see-through member through which a vehicle occupant M who has boarded the occupant chamber 4 visually recognizes the outside of the vehicle.

The vehicle occupant M enters the occupant chamber 4 and sits on the corresponding seat 6. When driving, the vehicle occupant M is held to the seat 6 by a seatbelt 9.

A room mirror 10 for checking behind the vehicle body 2 is disposed at an upper section of the front windshield 8. Side mirrors 11 are disposed outside the occupant chamber 4 in the left direction and the right direction of the front-row seats 6. In addition to checking the area surrounding the front side of the automobile 1 through, for instance, the front windshield 8, the vehicle occupant M can check the area surrounding the rear side of the automobile 1 by using the room mirror 10 and the side mirrors 11.

The seat 6 for the vehicle occupant M driving the automobile 1 is surrounded by manipulation members, such as a steering wheel 12, a brake pedal 13, a gas pedal 14, and a shift lever 15. The vehicle occupant M sitting on the seat 6 manipulates the manipulation members to drive the automobile 1.

In recent years, the automobile 1 is equipped with a navigation device that displays a guidance route on a liquid crystal display and a device that assists in driving in an emergency situation by monitoring the driving environment using various types of radar.

However, the automobile 1 still runs based on manipulation by the vehicle occupant M. When driving, the vehicle occupant M checks, for instance, safety outside the vehicle through a vehicle window, such as the front windshield 8, determines the checked conditions outside the vehicle, and manipulates the automobile 1 accordingly. In this case, running stability of the automobile 1 and safety are basically determined in accordance with the driving ability of the vehicle occupant M. In accordance with the conditions, the vehicle occupant M drives the automobile 1 while switching his/her line of vision to appropriately check the front side, the diagonally front side, the left and right sides, the rear side, the diagonally rear side, and so on of the vehicle body 2 and also while stably maintaining the sightline in a certain direction.

Therefore, for instance, with regard to safety, a novice driver who does not know how to use his/her line of vision for checking the surroundings during driving is required to properly perform a necessary safety check of the outside of the vehicle in a manner similar to an experienced driver. For instance, it is necessary to visually check the front side, the front right side, and the front left side.

Furthermore, a bus driver who drives in a fatigued state is also required to perform a necessary safety check in a manner similar to a normal non-fatigued vehicle occupant M.

Moreover, even when the vehicle occupant M tries to check outside the vehicle, there may be situations where the check cannot be performed sufficiently due to difficult visibility of the surroundings caused by, for instance, heavy rain. Even in such foul weather conditions, the vehicle occupant M is still required to perform a necessary safety check.

Accordingly, even during foul weather, such as heavy rain at night, a novice driver who does not know how to use his/her line of vision during driving is still required to properly perform a necessary safety check and continue driving safely in accordance with the conditions.

In addition, with regard to running stability, the vehicle occupant M is required to drive while properly checking the path with his/her line of vision.

For instance, when cornering along a curved road, it is first desired to bring the vehicle body 2 to a braking point at the outer edge of the path when entering the corner. Therefore, by utilizing this display method, the vehicle occupant M is led to naturally bring the vehicle body 2 toward the outer side of the braking point. With this display method, the vehicle body 2 is guided to a clipping point. At the same time, the sightline is guided farther away so that a circular arc can be drawn while stabilizing the vehicle-body behavior. The vehicle occupant M drives the automobile 1 with such a line of vision so that the automobile 1 can run stably in the latter half of the corner and trace an out-in-in line that allows for an easy evasive action. The vehicle body 2 can smoothly travel along the corner in a stable state. As a result, not only the running stability of the automobile 1 is enhanced, but also the driving safety is enhanced.

Accordingly, the automobile 1 is potentially required not only to present information about a guidance route and to assist in driving in an emergency situation, but also to assist in actual driving by the vehicle occupant M.

Figure 2:
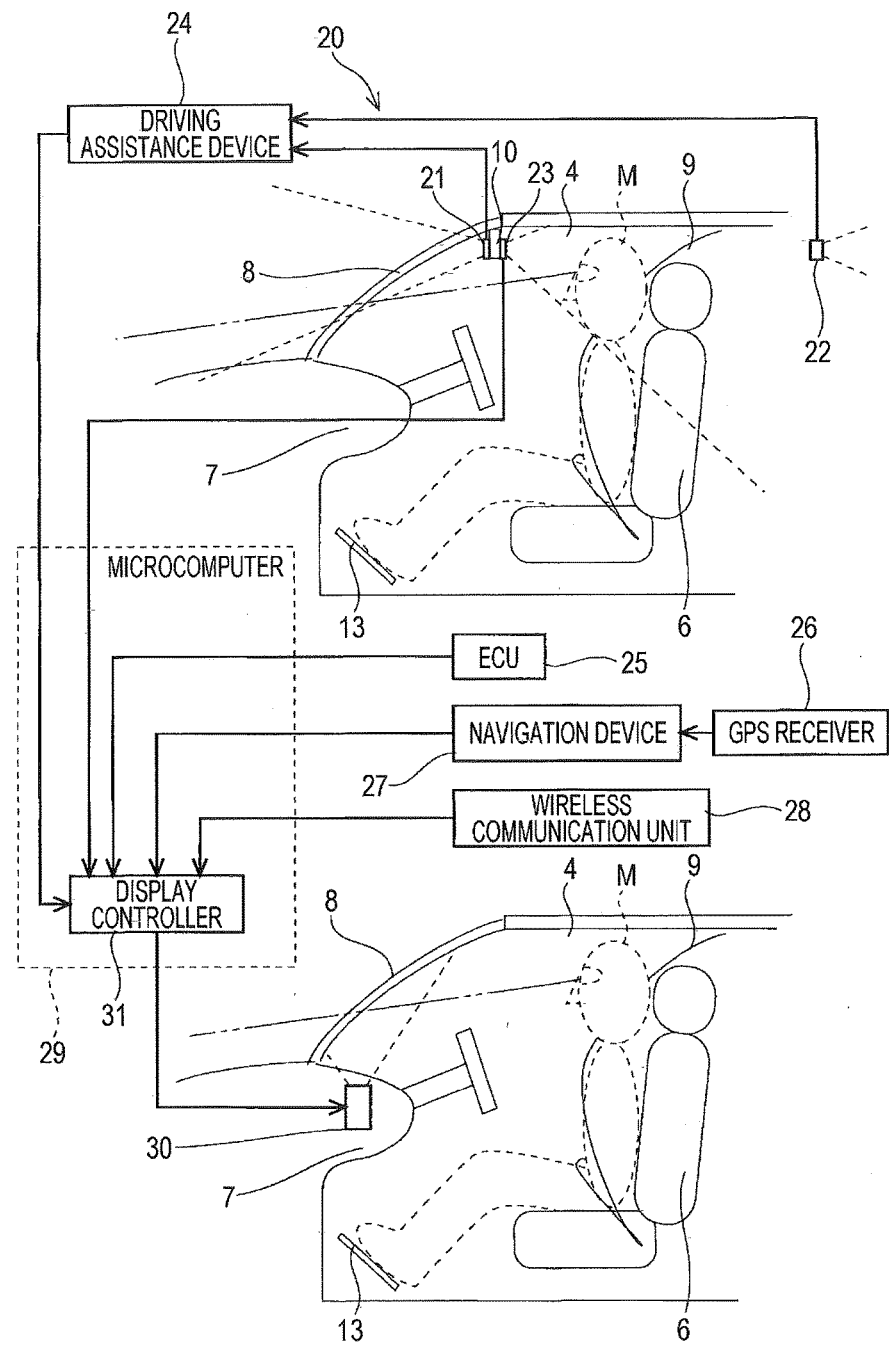
FIG. 2 schematically illustrates the configuration of a sightline guidance system installed in the automobile in FIG. 1.

FIG. 2 schematically illustrates the configuration of a sightline guidance system 20 installed in the automobile 1 in FIG. 1.

The sightline guidance system 20 in FIG. 2 has a front camera 21, a rear camera 22, an in-vehicle camera 23, a driving assistance device 24, an engine control unit (ECU)

25, a global-positioning-system (GPS) receiver 26, a navigation device 27, a wireless communication unit 28, a microcomputer 29, and a projector 30. A display controller 31 is realized in the microcomputer 29.

The front camera 21 is a camera that captures an image of the outside ahead of the vehicle body 2. The front camera 21 may be, for instance, a plurality of complementary metal oxide semiconductor (CMOS) sensors. For instance, the CMOS sensors are fixed facing forward and arranged in the left-right direction of the vehicle body 2 along the upper edge of the front windshield 8. The CMOS sensors may alternatively be fixed and arranged facing forward on the front surface of the room mirror 10. With the CMOS sensors fixed to the vehicle body 2, a plurality of images, which are slightly displaced from one another in the left-right direction, of the outside scenery ahead of the vehicle body 2 as well as a target object, such as another automobile, can be obtained. An imaging position in each image indicates a relative direction from the corresponding CMOS sensor toward the target object. The relative direction and a relative distance from the vehicle (vehicle body 2) to the target object can be calculated based on, for instance, a trigonometric arithmetic method in which the installed positions of the multiple CMOS sensors act as the apex of the base. A relative spatial position of the target object with reference to the vehicle (vehicle body 2) can be obtained.

The rear camera 22 is a camera that captures an image behind the vehicle body 2. The rear camera 22 may be, for instance, a plurality of CMOS sensors. For instance, the CMOS sensors are fixed and arranged in the left-right direction of the vehicle body 2 along the upper edge of the rear window. The CMOS sensors may alternatively be fixed and arranged facing rearward on the left and right side mirrors 11. With the CMOS sensors fixed to the vehicle body 2, a plurality of images, which are slightly displaced from one another in the left-right direction, of the outside scenery behind the vehicle body 2 as well as a target object, such as another automobile, can be obtained. A relative spatial position of the target object with reference to the vehicle (vehicle body 2) can be obtained.

The in-vehicle camera 23 is a camera that captures an image inside the occupant chamber 4. The in-vehicle-camera 23 may be, for instance, a plurality of CMOS sensors. For instance, the CMOS sensors are fixed facing rearward and arranged in the left-right direction of the vehicle body 2 at the upper edge section of the front windshield 8. Instead of this trigonometric arrangement, one of the CMOS sensors may be fixed facing rearward on the dashboard 7 and the other CMOS sensor may be fixed facing downward on the roof of the vehicle body 2 above the seats 6. Even in this case, a relative spatial position with reference to the vehicle (vehicle body 2) can be calculated for the head and the eyes of the vehicle occupant M based on an orthogonal coordinate system from the imaging positions of the head and the eyes of the vehicle occupant M sitting on the seat 6 in each image.

The driving assistance device 24 is a computer device connected to the front camera 21 and the rear camera 22. For instance, based on the images captured by these cameras, the driving assistance device 24 generates information about a moving object, such as another automobile 1, existing in the area surrounding the vehicle (vehicle body 2). The information about the moving object includes a relative direction and a relative distance as well as a relative moving direction. The relative moving direction of the moving object can be calculated based on changes in direction and distance of the moving object in a plurality of images captured in consecutive time points. The driving assistance device 24 determines a risk of, for instance, a collision based on the generated information about the moving object. If there is a risk of a collision, the driving assistance device 24 outputs a brake signal and an airbag deployment signal to the ECU 25.

Furthermore, the driving assistance device 24 outputs data of the images captured by the front camera 21 and the rear camera 22 to the display controller 31 of the microcomputer 29 together with the moving-object information indicating the risk surrounding the vehicle body 2. The images captured by the front camera 21 and the rear camera 22 can be used as vehicle-window scenery images with respect to the scenery visually recognized by the vehicle occupant M from inside the vehicle.

The ECU 25 is a computer device that controls driving of the automobile 1 based on manipulation by the vehicle occupant M and a signal from, for instance, the driving assistance device 24. The ECU 25 outputs control signals to the engine and the brake device of the automobile 1. The ECU 25 outputs, to the display controller 31, relevant information regarding driving of the vehicle body 2, such as the vehicle speed, the steer angle of the steering wheel 12, manipulation and non-manipulation of the brake pedal 13, and the manipulated amount thereof.

The GPS receiver 26 receives a GPS signal from a GPS satellite. The GPS receiver 26 generates information such as the spatial position (latitude, longitude, and altitude) of the vehicle (vehicle body 2), the moving speed thereof, and the time from a plurality of GPS signals received from a plurality of GPS satellites. The GPS receiver 26 outputs the generated relevant information regarding traveling of the vehicle body 2 to the display controller 31.

The navigation device 27 is connected to the GPS receiver 26. The navigation device 27 has accumulative information, such as map data, road data, and geography data. The road data includes node data related to, for instance, intersections of a plurality of roads and also includes link data related to each road segment between intersections. The node data includes information such as number-of-lanes information and lane regulation information at intersections. The link data includes information such as number-of-lanes information and lane regulation information on each road. By setting a destination, the navigation device 27 generates, for instance, data indicating the traveling route from the current location to the destination by using the accumulative information, and displays the generated traveling route together with a map on the display.

Furthermore, the navigation device 27 outputs the map data, the road data, the geography data, and the guidance route data to the display controller 31 of the microcomputer 29. The map data, the road data, the geography data, and the guidance route data can be used as scenery information regarding the vehicle-window scenery visually recognized by the vehicle occupant M from inside the vehicle.

The wireless communication unit 28 performs wireless communication with, for instance, a land-based base station. The wireless communication unit 28 acquires information from a server device connected to, for instance, the Internet via the base station. Such information includes, for instance, traffic information and regulation information. Furthermore, the wireless communication unit 28 may acquire, for instance, positional information, a moving speed, and a moving direction of a portable telephone existing in the surroundings. The positional information of the portable telephone can be used as, for instance, positional information of a moving object, such as a person, a child, or a dog. Moreover, the wireless communication unit 28 may acquire map data, road data, and geography data of the surroundings of the area in which the vehicle (vehicle body 2) travels. Then, the navigation device 27 outputs the acquired information to the display controller 31 of the microcomputer 29.

For instance, components, such as the GPS receiver 26, the navigation device 27, and the wireless communication unit 28, may be detachable from the vehicle body 2. Devices that can be used for such a purpose include a portable information terminal, such as a portable telephone and a multifunction portable communication device. Furthermore, an imaging device of a portable information terminal may be used as any one of the front camera 21, the rear camera 22, and the in-vehicle camera 23. In this case, for instance, the portable information terminal can be attached in a predetermined orientation to the vehicle body 2 so as to be used as any one of the front camera 21, the rear camera 22, and the in-vehicle camera 23 fixed in a predetermined imaging direction to the vehicle body 2.

The projector 30 projects an image onto, for instance, the front windshield 8. Alternatively, the projector 30 may project an image onto a transparent or semi-transparent screen installed between the vehicle occupant M and the front windshield 8 or onto a pair of glasses worn by the vehicle occupant M. In order to display the projected image, the front windshield 8 may have, for instance, a see-through film bonded thereto. The projector 30 is disposed within the dashboard 7 and is oriented toward the front windshield 8. In accordance with reflection light from the front windshield 8, the image projected on the front windshield 8 can be visually recognized by the vehicle occupant M. By adjusting the quantity of light projected onto the front windshield 8 from the projector 30 or by limiting the projecting range or time of the image on the front windshield 8, the vehicle occupant M can visually recognize the image projected on the front windshield 8 while visually recognizing the scenery outside the vehicle through the front windshield 8.

The microcomputer 29 is connected to the in-vehicle camera 23, the driving assistance device 24, the ECU 25, the navigation device 27, the wireless communication unit 28, and the projector 30. The microcomputer 29 is a computer device having a memory and a central processing unit (CPU). The CPU reads and executes a program stored in the memory. Thus, the display controller 31 is realized in the microcomputer 29.

By using the information input to the microcomputer 29 from these connected devices, the display controller 31 outputs, to the projector 30, an image for guiding the sightline of the vehicle occupant M so as to caution the vehicle occupant M. Thus, for allowing the vehicle occupant M who has boarded the vehicle body 2 to visually recognize the outside of the vehicle, the image for guiding the sightline of the vehicle occupant M is disposed on the see-through front windshield 8. As will be described later, for instance, the display controller 31 specifies perspective coordinates on the front windshield 8 that the sightline of the vehicle occupant M passes when the vehicle occupant M visually recognizes a predicted path along which the vehicle body 2 is predicted to travel based on outside scenery information and also determines perspective coordinates where the left edge and the right edge of the predicted path are projected. Then, the display controller 31 displays, on the front windshield 8, a pair of driving reference marks that are aligned with the left edge and the right edge of the predicted path.

For instance, the function of the driving assistance device 24, the function of the ECU 25, the function of the navigation device 27, and the function of the wireless communication unit 28 may be realized in the microcomputer 29 in addition to the function of the display controller 31. In this case, devices such as the front camera 21, the Tear camera 22, and the GPS receiver 26 may be connected directly to the microcomputer 29.

Next, an example of a sightline guidance process performed by the sightline guidance system 20 in FIG. 2 will be described. The sightline guidance system 20 displays scenery to be desirably viewed by the vehicle occupant M, for instance, a path with driving reference marks superimposed thereon, so as to guide the sightline of the vehicle occupant M.

Figure 3:
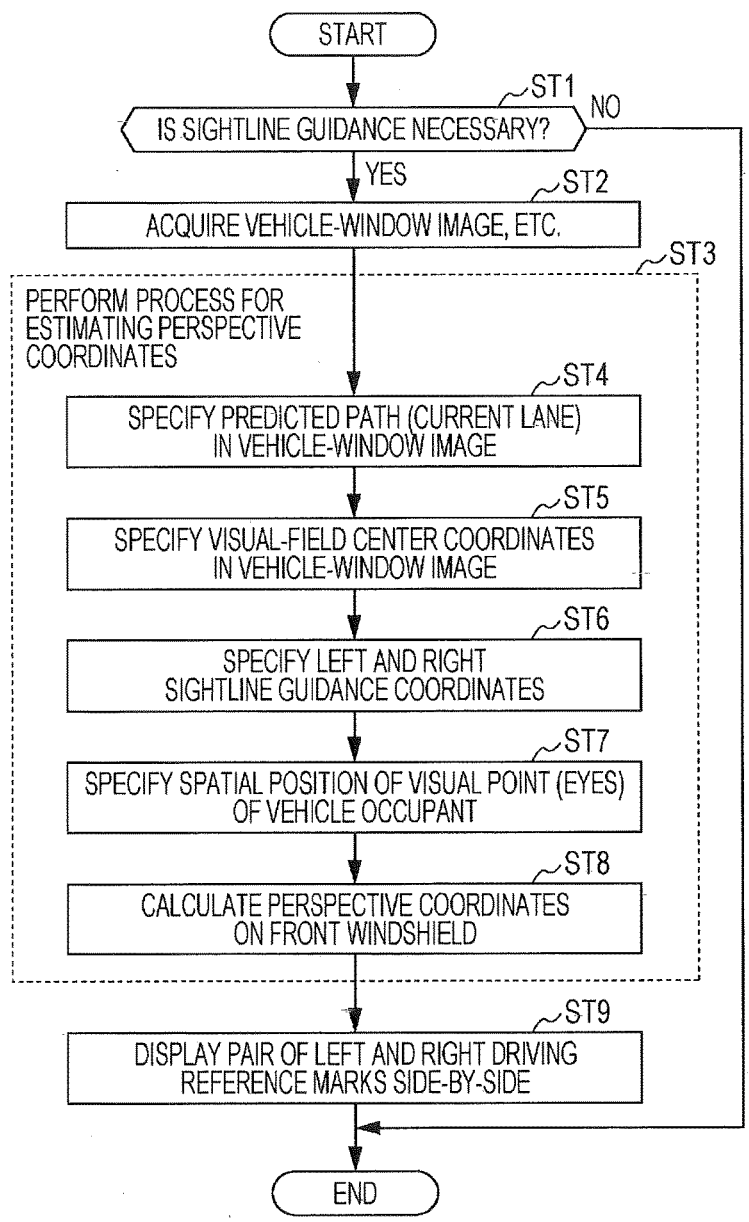
FIG. 3 is a flowchart of a display process periodically executed by a display controller in FIG. 2.

FIG. 3 is a flowchart of a display process periodically executed by the display controller 31 in FIG. 2. The display controller 31 repeatedly executes the process in FIG. 3, for instance, every 100 milliseconds and updates the display on the front windshield 8.

Figure 4:
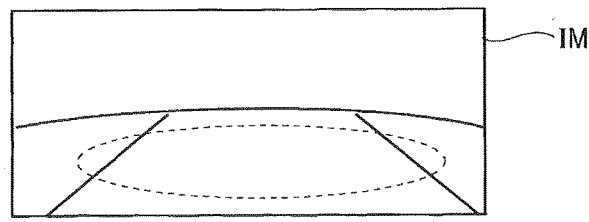
FIG. 4 illustrates an example of a vehicle-window image captured through a front windshield by a front camera.

FIG. 4 illustrates an example of a vehicle-window image IM captured through the front windshield 8 by the front camera 21.

Figure 5:
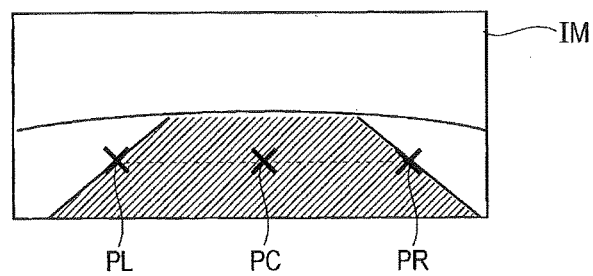
FIG. 5 illustrates an example of various specific sections specified on the vehicle-window image captured in FIG. 4.

FIG. 5 illustrates an example of various specific sections specified on the vehicle-window image IM captured in FIG. 4.

In order to guide the sightline of the vehicle occupant M, the display controller 31 periodically executes the display process in FIG. 3. First, the display controller 31 determines whether or not the display for guiding the sightline of the vehicle occupant M is necessary (step ST1).

For instance, the display controller 31 measures unstable behavior of the vehicle body 2 or the stress level of the vehicle occupant M and converts it into a numerical value. If the value exceeds a certain level, the display controller 31 determines that the sightline guidance display is necessary.

Furthermore, if there is a change in the driving environment, such as a sharp turn or sudden intrusion of another vehicle body 2, the display controller 31 determines that the sightline guidance display is necessary.

Furthermore, the display controller 31 may determine the most recent movement of the sightline of the vehicle occupant M and may determine that the sightline guidance display is necessary if, for instance, there is an unwary moving object.

In other cases, the display controller 31 determines that the sightline guidance display is not necessary and ends the display process in FIG. 3.

The display controller 31 may determine whether or not the sightline guidance display is necessary immediately before a display process to be described later.

If the display controller 31 determines that the sightline guidance display is necessary, the display controller 31 proceeds with the display process in FIG. 3 and acquires information for guiding the sightline (step ST2).

The information acquired in this process includes, for instance, an image ahead of the vehicle body 2 captured by the front camera 21, which can be used as a front vehicle-window image IM, and an in-vehicle image captured by the in-vehicle camera 23, which can be used for determining the sightline of the vehicle occupant M.

After acquiring the information for guiding the sightline, the display controller 31 estimates perspective coordinates P(x, y) on the front windshield 8 that the sightline of the vehicle occupant M passes when the vehicle occupant M looks at a spatial position regarding a direction or a point to which the sightline of the vehicle occupant M is desirably guided (step ST3).

Driving reference marks 41 for guiding the sightline of the vehicle occupant M are displayed at the perspective coordinates P(x, y) so that the sightline of the vehicle occupant M can be guided to the aforementioned direction or point. The following description relates to an example where the sightline of the vehicle occupant M is guided toward a predicted path. In the vehicle-window image IM in FIG. 4, the road extends straight in the forward direction ahead of the vehicle body 2. In this case, as indicated by a dotted-line frame in FIG. 4, the vehicle occupant M needs to visually check the condition of the surface of the road serving as the path of the automobile 1.

In the estimation process of the perspective coordinates P(x, y) of the sightline toward the guidance point, the display controller 31 first specifies a coordinate range, which is the predicted path (i.e., the current lane), in the vehicle-window image IM (step ST4).

For instance, by using the guidance route data and the link data in the road data, the display controller 31 specifies an image-captured coordinate range obtaining by capturing an image of the road serving as the predicted path in the vehicle-window image IM. For instance, in the case of the vehicle-window image IM in FIG. 4, the hatched image-captured range of the straight road in FIG. 5 becomes the image-captured coordinate range of the road serving as the predicted path.

If it is determined based on the road data that the road is a two-lane road or that the road is a four-lane road with two lanes on each side, the image-captured range of the lane on which the vehicle travels may be set as the image-captured coordinate range acting as the predicted path.

Furthermore, if a white lane line or yellow lane line that divides the road for each lane is recognizable as a result of the process executed on the vehicle-window image IM, the image-captured range of the lane on which the vehicle travels may be specified based on this information.

After specifying the image-captured coordinate range acting as the predicted path (i.e., the current lane), the display controller 31 specifies visual-field center coordinates PC, at which the entire road surface of the predicted path can be viewed, in the vehicle-window image IM (step ST5).

The display controller 31 specifies, for instance, a central position of a predetermined distance on the predicted path as the visual-field center coordinates PC. In the case of the vehicle-window image IM in FIG. 4, for instance, the center of the dotted-line frame in FIG. 4 is specified as the visual-field center coordinates PC, as illustrated in FIG. 5.

After specifying the visual-field center coordinates PC in the vehicle-window image IM, the display controller 31 specifies a pair of left and right sightline guidance coordinates PL and PR separated from the visual-field center coordinates PC by a distance equivalent to the lane width or the vehicle width (step ST6). Specifically, in the case of the vehicle-window image IM in FIG. 4, the display controller 31 specifies a pair of sightline guidance coordinates PL and PR that are located in the left-right direction (horizontal direction) from the visual-field center coordinates PC in FIG. 5 and that have been obtained by image-capturing the left edge and the right edge of the lane.

The vehicle-width information, the road-width information, and the lane-width information can be acquired from the navigation device 27. The display controller 31 refers to the acquired information and specifies the pair of left and right sightline guidance coordinates PL and PR such that they are separated from each other by a distance larger than or equal to the vehicle width. If the road width or the lane width is smaller than the vehicle width, the pair of sightline guidance coordinates PL and PR are specified by being shifted from the left edge and the right edge of the lane so that the separation distance therebetween becomes larger than or equal to the vehicle width.

Next, the display controller 31 specifies a spatial position of the visual point (origin of the line of vision) of the vehicle occupant M based on an in-vehicle image captured by the in-vehicle camera 23 (step ST7).

In the case of FIG. 2, the captured in-vehicle image includes the face of the vehicle occupant M. In this case, by identifying the position of the head or the eyes in the image, the direction of the head or the eyes relative to the in-vehicle camera 23 can be specified. Furthermore, the vehicle occupant M is seated in the seat 6 and is held thereto by the seatbelt 9. Thus, the distance to the head or the eyes from the in-vehicle camera 23 can be estimated from information about the front-rear position of the seat 6, which is slidable. Based on these pieces of information, the display controller 31 specifies the spatial position of the head or the eyes of the boarded vehicle occupant M.

In addition, for instance, in a state where a reference mark aligned with a predetermined object outside the vehicle is displayed, the vehicle occupant M may be made to move his/her head sideways. In a state where the reference mark appears to be aligned with the predetermined object outside the vehicle, an image may be captured and stored as a reference image. Subsequently, based on a difference between the image-captured position of the head or the eyes in the reference image and the image-captured position of the head or the eyes in the in-vehicle image at the time of processing, the spatial position of the head or the eyes of the boarded vehicle occupant M may be specified. Even in this case, the display controller 31 can specify an approximate spatial position of the head or the eyes of the boarded vehicle occupant M.

Next, the display controller 31 calculates perspective coordinates P(x, y) on the front windshield 8 that the sightline of the vehicle occupant M passes when the vehicle occupant M looks at a sightline guidance position through the front windshield 8 (step ST8).

Figure 6:
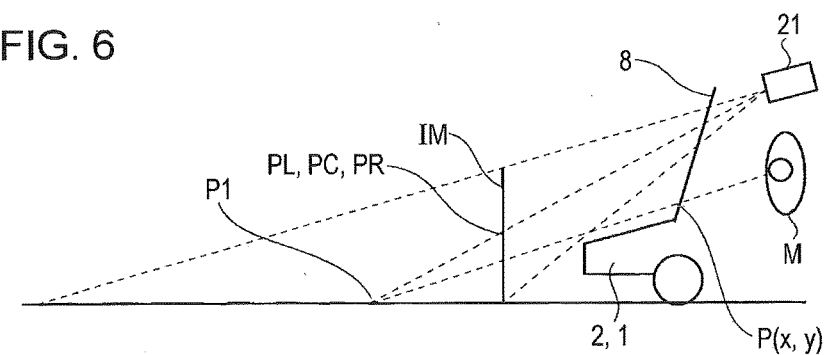
FIG. 6 illustrates an example of a calculation process for obtaining perspective coordinates on the front windshield.

FIG. 6 illustrates an example of a calculation process for obtaining the perspective coordinates P(x, y) on the front windshield 8. FIG. 6 is a schematic cross-sectional view the vehicle body 2 and the road, taken along a vertical plane. In FIG. 6, the road surface, the front camera 21 fixed to the vehicle body 2, the front windshield 8, and the head and the eyes of the vehicle occupant M are illustrated. Moreover, the vehicle-window image IM captured by the front camera 21 is also schematically illustrated. In this case, the vehicle-window image IM can be treated as an imaginary image set at an intersection point between the lower edge of the image-capturing range of the front camera 21 and the road surface ahead of the vehicle body 2.

Under such a spatial positional relationship, the spatial position of a sightline guidance point P1 on the road can be obtained by extending a line segment that connects the front camera 21 and the sightline guidance coordinates PL and PR in the vehicle-window image IM. Then, a line segment that connects the spatial position of the sightline guidance point P1 on the road and the spatial position of the head or the eyes of the vehicle occupant M intersects the front windshield 8. By performing calculation based on this positional relationship, the display controller 31 can calculate the perspective coordinates P(x, y) on the front windshield 8 that the sightline passes when the vehicle occupant M looks at the sightline guidance point P1 through the front windshield 8.

After calculating the perspective coordinates P(x, y) on the front windshield 8, the display controller 31 starts a process for displaying the pair of driving reference marks 41 side-by-side at the corresponding perspective coordinates P(x, y) (step ST9).

The display controller 31 displays the right driving reference mark 41 at the right perspective coordinates P(x, y) and displays the left driving reference mark 41 at the left perspective coordinates P(x, y).

Figure 7:
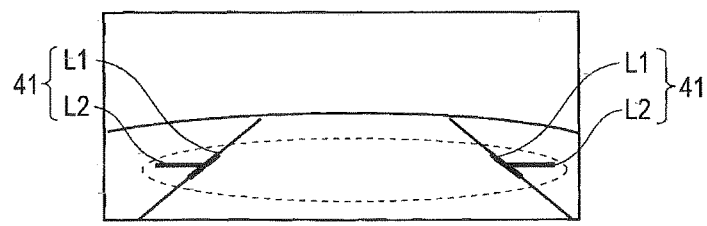
FIG. 7 illustrates an example of vehicle-window scenery viewed through the front windshield by a vehicle occupant.

FIG. 7 illustrates an example of vehicle-window scenery viewed through the front windshield 8 by the vehicle occupant M. In FIG. 7, the pair of driving reference marks 41 are displayed side-by-side in alignment with the left and right edges of the lane on which the vehicle travels.

Specifically, the right driving reference mark 41 includes a driving reference line L1 extending in alignment with the right edge of the lane and a sightline reference line L2 extending toward the outer right side from the driving reference line L1. The left driving reference mark 41 includes a driving reference line L1 extending in alignment with the left edge of the lane and a sightline reference line L2 extending toward the outer left side from the driving reference line L1. The pair of left and right sightline reference lines L2 are displayed at the same height.

With the pair of driving reference marks 41, the sightline of the vehicle occupant M may be guided particularly to the height position of the pair of sightline reference lines L2. Then, with the pair of driving reference lines L1, the vehicle occupant M can visually recognize the spatial position of the right edge of the lane and the spatial position of the left edge of the lane. Furthermore, since the pair of driving reference marks 41 appear to be aligned with the left and right edges of the lane, the vehicle occupant M can recognize that the lane width is larger than or equal to the vehicle width of the vehicle body 2.

Accordingly, in this example, the display controller 31 acquires the vehicle-window image IM visually recognized by the vehicle occupant M from inside the vehicle. Based on the vehicle-window image IM, the display controller 31 specifies the perspective coordinates P(x, y) on the front windshield 8 that the sightline of the vehicle occupant M passes when the vehicle occupant M visually recognizes the left and right edges of the predicted path along which the vehicle is predicted to travel. Then, based on the perspective coordinates P(x, y), the projector 30 displays the pair of driving reference marks 41 side-by-side on the front windshield 8 such that they are separated from each other by a distance equivalent to the vehicle width or larger. Thus, the vehicle occupant M can look at the pair of driving reference marks 41 displayed on the front windshield 8 in alignment with the left and right edges of the predicted path of the vehicle body 2. The sightline of the vehicle occupant M may be guided to the predicted path highlighted by the pair of driving reference marks 41. The vehicle occupant M can check the predicted path, which needs to be checked during driving. The vehicle occupant M can check whether or not he/she can drive safely by checking between the pair of driving reference marks 41.

Furthermore, by displaying the pair of driving reference marks 41, the sightline of the vehicle occupant M is made stable on the predicted path. As a result, the vehicle body 2 can travel stably.

Moreover, even after the vehicle occupant M moves his/her sightline in another direction, the vehicle occupant M can readily and quickly move his/her sightline back toward the desired predicted path. When moving the sightline back toward the predicted path, it is not necessary to search for the predicted path.

In particular, since the pair of driving reference marks 41 are displayed in alignment with the left and right edges of the predicted path, the line of vision of the vehicle occupant M becomes less likely to be focused on one point, so that the vehicle occupant M can readily observe the entire predicted path. In addition to the predicted path, the left and right sides of the predicted path can also be readily checked.

In contrast, for instance, assuming that a single driving reference mark 41 is displayed at the center of the predicted path, the line of vision of the vehicle occupant M tends to become focused on that one point. As a result, even if the sightline of the vehicle occupant M can be guided to the predicted path with the single driving reference mark 41, the vehicle occupant M becomes consciously focused on that one point, thus making it difficult to observe the entire predicted path. In particular, it becomes difficult to perform a safety check for the left and right edges of the predicted path, which are slightly distant from the single driving reference mark 41. In this example, such misleading is less likely to occur.

Furthermore, in this example, the display controller 31 specifies, in the vehicle-window image IM, the perspective coordinates P(x, y) of the edges of the road or the lane along which the vehicle (vehicle body 2) travels, and the projector 30 displays the driving reference marks 41 at the perspective coordinates P(x, y). Thus, the vehicle occupant M can see the pair of driving reference marks 41 in alignment with the left and right edges of the predicted path of the vehicle (vehicle body 2).

Furthermore, as described above, in this example, the display controller 31 acquires scenery information regarding the scenery visually recognized by the vehicle occupant M from inside the vehicle. Based on the scenery information, the display controller 31 specifies the perspective coordinates P(x, y) on the front windshield 8 that the sightline of the vehicle occupant M passes when the vehicle occupant M visually recognizes the predicted path along which the vehicle is predicted to travel. Then, based on the perspective coordinates P(x, y), the projector 30 displays the pair of driving reference lines L1 side-by-side on the front windshield 8 such that they respectively extend along the left and right edges and are separated from each other by a distance equivalent to the vehicle width or larger. Thus, the vehicle occupant M can see the pair of driving reference lines L1 displayed on the front windshield 8 in alignment with the left and right edges of the predicted path of the vehicle. The sightline of the vehicle occupant M may be guided to the predicted path highlighted by the pair of driving reference lines L1. The vehicle occupant M can check, for instance, the width and the forward direction of the predicted path, which needs to be checked during driving. The vehicle occupant M can check whether or not he/she can drive safely by checking between the pair of driving reference lines L1.

Furthermore, in this example, the pair of sightline reference lines L2 extending outward from the pair of driving reference lines L1 are displayed together with the pair of driving reference lines L1. With the two substantially-T-shaped marks, the predicted path is displayed by being interposed therebetween. Humans have a tendency to align their line of vision with lines extending in the horizontal direction. With the pair of sightline reference lines L2, guidance is achieved at the height level of the line of vision. In a display having substantially-T-shaped intersection points, the vehicle occupant M has a tendency to keep his/her line of vision near the intersection points. A display having a pair of substantially-T-shaped portions separated from each other in the horizontal direction causes the vehicle occupant M to be aware of the area between these portions. By utilizing these characteristics, a display having a pair of substantially-T-shaped portions can make the sightline stable.

By displaying this combination of driving reference lines L1 and sightline reference lines L2, the sightline of the vehicle occupant M is made stable on the predicted path in the distance corresponding to the pair of sightline reference line L2. As a result, the automobile 1 can travel stably. Moreover, even after the vehicle occupant M moves his/her sightline in another direction, the vehicle occupant M can readily and quickly move his/her sightline back in the direction of the aforementioned distance. When moving the sightline back in the direction of the aforementioned distance, it is not necessary to search for the predicted path. Since the pair of substantially-T-shaped portions are displayed in areas to which the sightline is desirably guided, the vehicle occupant M can instinctively ascertain the road width and the traveling direction at the position of the line of vision.

In particular, since the pair of driving reference lines L1 are displayed in alignment with the left and right edges of the predicted path, the line of vision of the vehicle occupant M becomes less likely to be focused on one point, so that the vehicle occupant M can readily observe the entire predicted path. In addition to the predicted path, the left and right sides of the predicted path can also be readily checked.

In contrast, for instance, assuming that a single driving reference line is displayed on the predicted path, the line of vision of the vehicle occupant M tends to become focused on that one line. As a result, even if the sightline of the vehicle occupant M can be guided to the predicted path with the single driving reference line, the vehicle occupant M becomes consciously focused on that one line, thus making it difficult to observe the entire direction of the predicted path. In particular, it becomes difficult to perform a safety check for the left and right sides of the predicted path, which are slightly distant from the single driving reference line. In this example, such misleading is less likely to occur.

Furthermore, in this example, the sightline reference lines L2 extending outward from the respective driving reference lines L1 are longer than the driving reference lines L1. Thus, the pair of driving reference lines L1 and the pair of sightline reference lines L2 displayed separately from each other at the left and right sides in the horizontal direction are given a sense of unity. The vehicle occupant M can recognize the overall display as a single relevant display. Moreover, the sightline of a person tends to be guided to the area between the pair of sightline reference lines L2. By utilizing these characteristics, the sightline of the vehicle occupant M can be guided to the area between the pair of sightline reference lines L2.

Furthermore, in this example, the projector 30 displays the sightline reference lines L2 at a height to which the sightline of the vehicle occupant M is desirably guided. Thus, regardless of the length of the pair of driving reference lines L1, the sightline of the vehicle occupant M can be guided to the area between the pair of sightline reference lines L2.

SECOND EXAMPLE

A second example to be described below relates to a case where the pair of driving reference marks 41 and a caution line 42 are displayed on the front windshield 8.

The configurations of the automobile 1 and the sightline guidance system 20 in the second example are identical to those in the first example, and descriptions thereof will be omitted by using the same reference characters. In the following description, main differences will be described.

Figure 8:
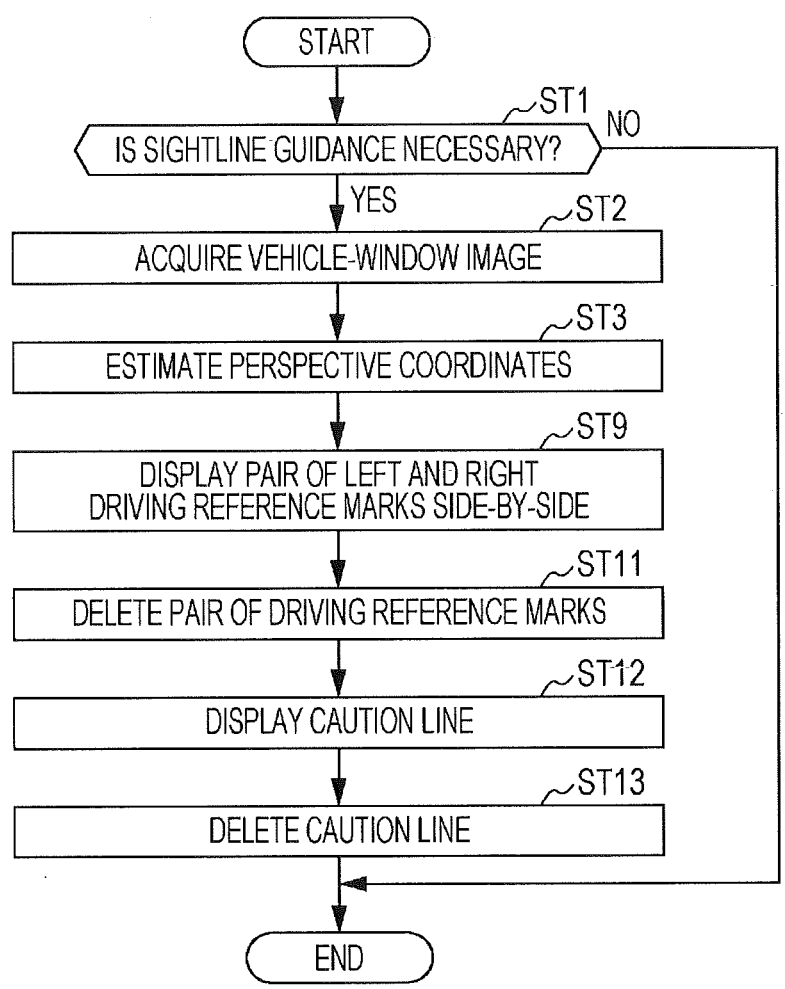
FIG. 8 is a flowchart of a display process according to a second example of the present invention.

FIG. 8 is a flowchart of a display process according to the second example of the present invention.

Figure 9A:
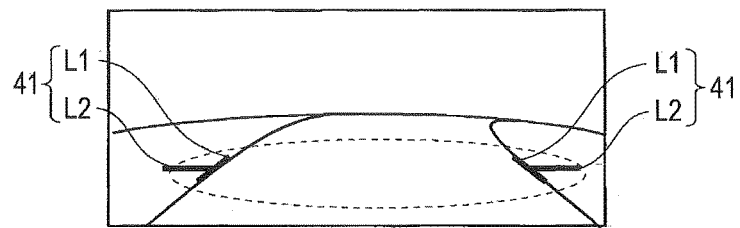
FIGS. 9A and 9B illustrate a display example of the front windshield that displays a pair of driving reference marks and a caution line in a switching fashion.
Figure 9B:
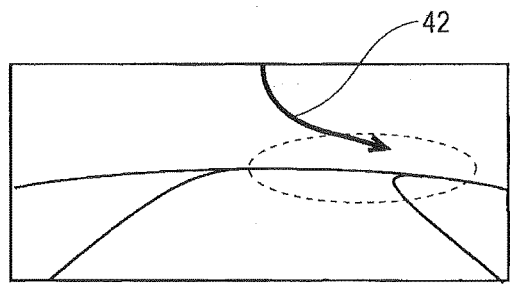

FIGS. 9A and 9B illustrate a display example of the front windshield 8 that displays the pair of driving reference marks 41 and the caution line 42 in a switching fashion. FIG. 9A illustrates a state where the pair of driving reference marks 41 are displayed. FIG. 9B illustrates a state where the single caution line 42 is displayed.

As illustrated in FIG. 8, after calculating the perspective coordinates P(x, y) on the front windshield 8 that the sightline passes in step ST3, the display controller 31 starts the display process.

As illustrated in FIG. 9A, in the display process, the display controller 31 first displays the pair of driving reference marks 41 side-by-side at the corresponding perspective coordinates P(x, y) (step ST9). Thus, the sightline is guided to the road surface and the surroundings of the path.

After displaying the pair of driving reference marks 41 for a predetermined period, the display controller 31 deletes the pair of driving reference marks 41 (step ST11), and displays the caution line 42, as illustrated in FIG. 9B (step ST12). Subsequently, the caution line 42 is deleted (step ST13). The caution line 42 in FIG. 9B indicates the direction of the guidance route. The caution line 42 indicating the direction of the guidance route extends from the center of the upper edge of the front windshield 8 and curves rightward and downward along the predicted path. By displaying such a caution line 42, the sightline is guided, so that the vehicle occupant M can recognize that the predicted path curves rightward. Thus, a caution point for driving the vehicle body 2 can be indicated.

It is apparent from a comparison between FIGS. 9A and 9B that the caution line 42 is displayed in a positionally displaced manner so as not to overlap the displayed positions of the pair of driving reference marks 41. By avoiding positional and temporal overlap in this manner, the vehicle occupant M can readily recognize that the pair of driving reference marks 41 and the caution line 42, which are consecutively displayed, are different types of sightline guidance display corresponding to different caution points.

Accordingly, in this example, the projector 30 displays the caution line 42 indicating a caution point for driving the vehicle body 2 on the front windshield 8 in addition to the pair of driving reference marks 41. Thus, the sightline of the vehicle occupant M may be guided not only to the predicted path but also to the caution point for driving the vehicle body 2. The vehicle occupant M can recognize a caution point that he/she is not aware of or can quickly recognize a caution point.

In particular, in this example, the caution line 42 indicating a caution point for driving the vehicle body 2 is displayed at a different timing from the pair of driving reference marks 41 at a position that does not overlap the pair of driving reference marks 41. Thus, based on the display, the vehicle occupant M can distinguish the pair of driving reference marks 41 and the caution line 42 from each other and recognize that they are related to different causes. Moreover, based on the relationship and understanding of the displayed positions, the vehicle occupant M can readily determine, for instance, risks involved in the predicted path.

THIRD EXAMPLE

A third example to be described below relates to a case where the pair of driving reference marks 41 displayed on the front windshield 8 are changed in accordance with the conditions.

The configurations of the automobile 1 and the sightline guidance system 20 in the third example are identical to those in the first example, and descriptions thereof will be omitted by using the same reference characters. In the following description, main differences will be described.

Figure 10:
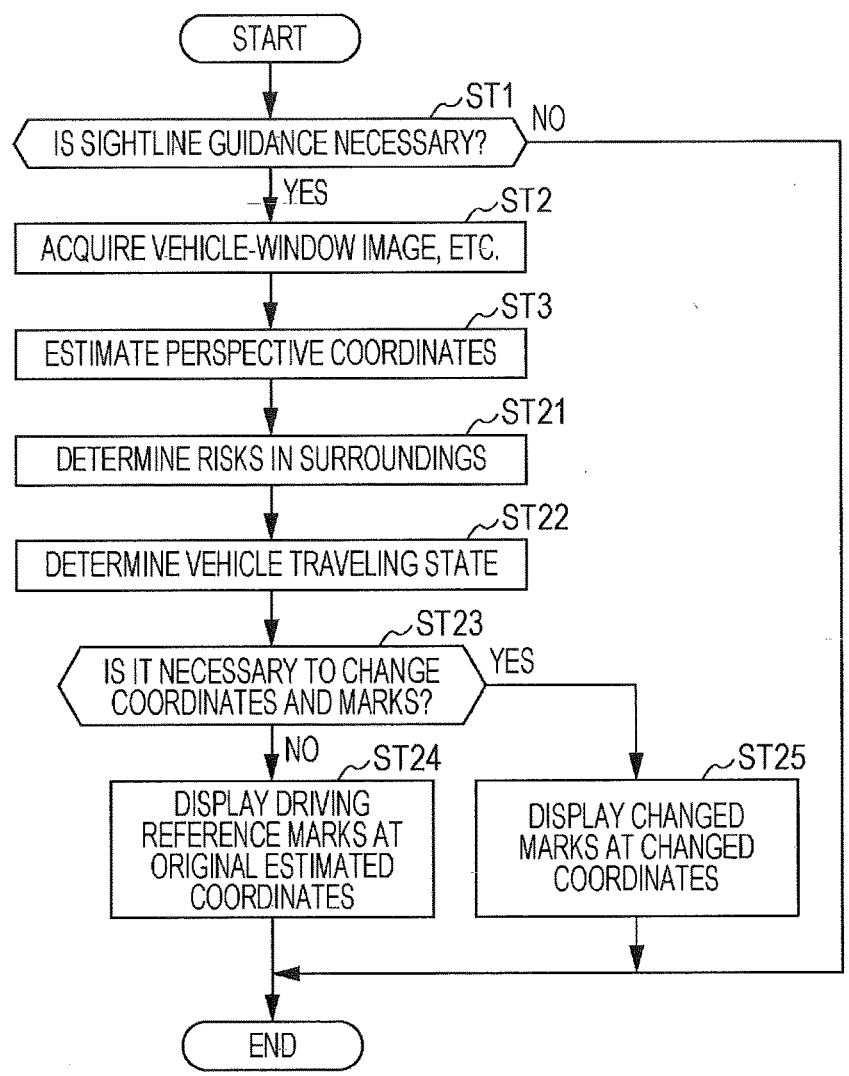
FIG. 10 is a flowchart of a display process according to a third example of the present invention.

FIG. 10 is a flowchart of a display process according to the third example of the present invention.

As illustrated in FIG. 10, after calculating the perspective coordinates P(x, y) on the front windshield 8 that the sightline passes in step ST3, the display controller 31 determines whether or not it is necessary to change the perspective coordinates P(x, y) and the driving reference marks 41 before starting the display process. Based on information acquired from the devices connected to the microcomputer 29, the display controller 31 determines whether or not a change is necessary.

Specifically, the display controller 31 first determines whether there are any risks in the surroundings (step ST21).

For instance, if a moving object, such as a bicycle 51, is displayed on or beside the road of the predicted path in the captured front image, the display controller 31 determines that a change is necessary.

Furthermore, if intrusion onto the road or a hazardous object is predicted, the display controller 31 determines that a change is necessary.

Moreover, if the road is curved sharply or if there is a change in the road surface, the display controller 31 determines that a change is necessary.

In other cases, the display controller 31 determines that a change is not necessary.

Subsequently, the display controller 31 determines the vehicle traveling state (step ST22).

For instance, if the captured front image is dark, the display controller 31 determines that a change is necessary.

Furthermore, if the vehicle speed is higher than or equal to a predetermined value, the display controller 31 determines that a change is necessary.

In other cases, the display controller 31 determines that a change is not necessary.

Subsequently, the display controller 31 determines whether or not a change is necessary (step ST23).

If all of the above determination results indicate that a change is not necessary, the display controller 31 determines that a change is not necessary and displays the pair of driving reference marks 41 at the original perspective coordinates P(x, y) (step ST24).

In other cases, the display controller 31 determines that a change is necessary and changes the driving reference marks 41 to be displayed and the display coordinates of the driving reference marks 41 in accordance with the cause of the determination result indicating that the change is necessary. Then, the changed driving reference marks 41 are displayed (step ST25).

FIGS. 11A to 11E illustrate various examples of how the pair of driving reference marks 41 displayed on the front windshield 8 by the projector 30 are changed.

Figure 11:
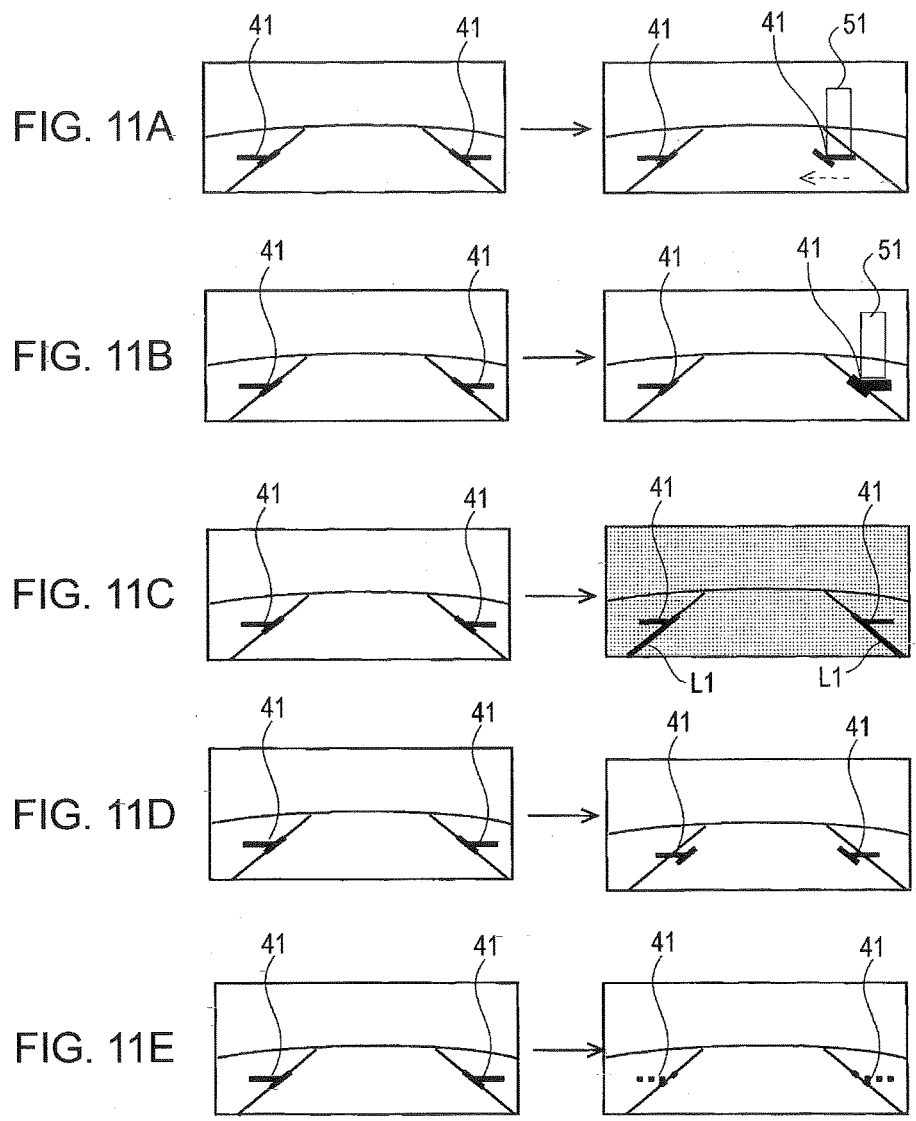
FIGS. 11A to 11E illustrate various examples of how the pair of driving reference marks displayed on the front windshield by a projector are changed.

FIG. 11A illustrates an example of a change when the bicycle 51 is traveling along the right edge of the road of the predicted path. In this case, the display coordinates of the right driving reference mark 41 are changed toward the center of the lane relative to the bicycle 51.

The right driving reference mark 41 may be displayed such that it moves from the position of the right edge of the lane toward the changed position.

If the distance between the pair of driving reference marks 41 after the change is smaller than the vehicle width, the display coordinates of the left driving reference mark 41 may be changed toward the left side so that the aforementioned distance is made equal to the vehicle width.

FIG. 11B illustrates an example of a change when there is a possibility that the bicycle 51 may intrude onto the road of the predicted path from the right side. In this case, the right driving reference mark 41 is changed to a thicker line than usual. Thus, a highlighted display with respect to the bicycle 51 intruding from the right side of the road becomes possible.

FIG. 11C illustrates an example of a change when the outside becomes dark upon entering, for instance, a tunnel. In this case, with regard to the respective driving reference marks 41, the driving reference lines L1 extending in alignment with the edges of the lane are extended toward the vehicle occupant M. Thus, even in a condition where it is difficult to visually recognize the lane due to the outside of the vehicle becoming dark, the lane can be readily recognized owing to the extended driving reference lines L1.

FIG. 11D illustrates an example of a change when the vehicle speed exceeds a predetermined speed limit. In this case, the pair of driving reference marks 41 are shifted toward the center of the lane so that the distance therebetween is decreased. Thus, the vehicle occupant M feels as if the lane width has decreased, possibility reducing the speed.

FIG. 11E illustrates an example of a change when the vehicle speed exceeds a predetermined speed limit. In this case, the pair of driving reference marks 41 are changed in color from, for instance, the normal green color to red color. Since the drawings are illustrated in black and white, this change in color is illustrated by changing solid lines to dotted lines. Thus, the vehicle occupant M can become aware of the fact that the vehicle speed has exceeded the speed limit.

Accordingly, in this example, the display controller 31 acquires relevant information regarding risks involved in the area surrounding the vehicle body 2 and the traveling state of the vehicle body 2, and the projector 30 changes the display of the pair of driving reference marks 41 in accordance with the relevant information.

Thus, the vehicle occupant M can recognize the relevant information regarding risks involved in the area surrounding the vehicle body 2 and the traveling state of the vehicle body 2 without having to move his/her line of vision from the pair of driving reference marks 41. For instance, the vehicle occupant M can check the causes recognized through the display. Thus, the Load on the vehicle occupant M for performing a safety check of the surroundings can be reduced.

FOURTH EXAMPLE

A fourth example to be described below relates to a case where a pair of lane lines for guiding the sightline of the vehicle occupant M are displayed on the front windshield 8.

The configurations of the automobile 1 and the sightline guidance system 20 in the fourth example are identical to those in the first example, and descriptions thereof will be omitted by using the same reference characters. In the following description, main differences will be described.

Next, an example of a sightline guidance process performed by the sightline guidance system 20 according to the fourth example of the present invention will be described. The sightline guidance system 20 displays scenery to be desirably viewed by the vehicle occupant M, for instance, a path with lane lines superimposed thereon, so as to guide the sightline of the vehicle occupant M.

Figure 12:
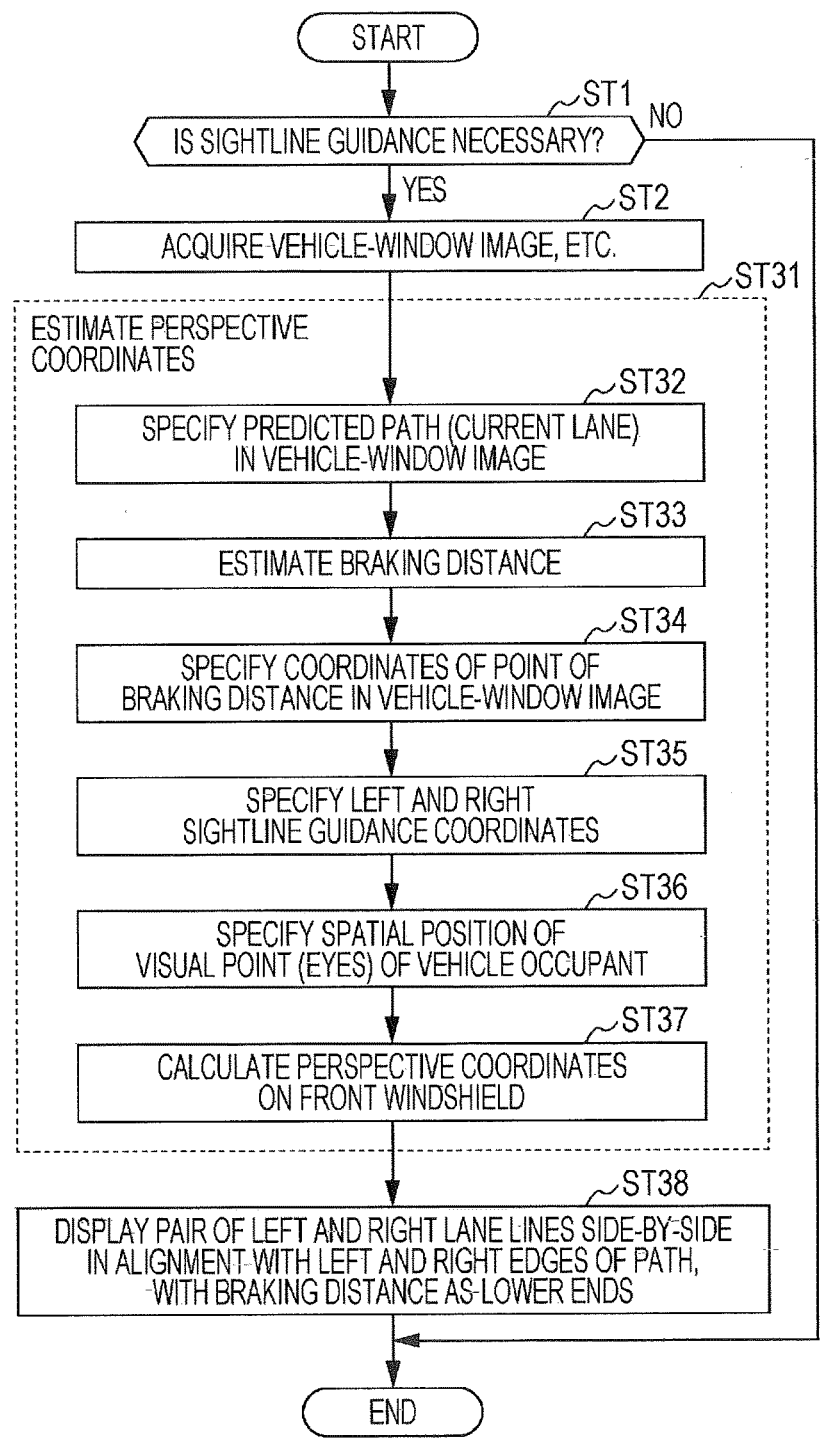
FIG. 12 is a flowchart of a display process periodically executed by the display controller according to a fourth example of the present invention.

FIG. 12 is a flowchart of a display process periodically executed by the display controller 31 according to the fourth example of the present invention. The display controller 31 repeatedly executes the process in FIG. 12, for instance, every 100 milliseconds and updates the display on the front windshield 8.

In order to guide the sightline of the vehicle occupant M, the display controller 31 periodically executes the display process in FIG. 12. First, the display controller 31 determines whether or not the display for guiding the sightline of the vehicle occupant M is necessary (step ST1).

For instance, the display controller 31 measures unstable behavior of the vehicle body 2 or the stress level of the vehicle occupant M and converts it into a numerical value. If the value exceeds a certain level, the display controller 31 determines that the sightline guidance display is necessary.

Furthermore, if there is a change in the driving environment, such as a sharp turn or sudden intrusion of another vehicle body 2, the display controller 31 determines that the sightline guidance display is necessary.

Furthermore, the display controller 31 may determine the most recent movement of the sightline of the vehicle occupant M and may determine that the sightline guidance display is necessary if, for instance, there is an unwary moving object.

In other cases, the display controller 31 determines that the sightline guidance display is not necessary and ends the display process in FIG. 12.

The display controller 31 may determine whether or not the sightline guidance display is necessary immediately before a display process to be described later.

If the display controller 31 determines that the sightline guidance display is necessary, the display controller 31 proceeds with the display process in FIG. 12 and acquires information for guiding the sightline (step ST2).

The information acquired in this process includes, for instance, an image ahead of the vehicle body 2 captured by the front camera 21, which can be used as a front vehicle-window image IM, and an in-vehicle image captured by the in-vehicle camera 23, which can be used for determining the sightline of the vehicle occupant M.

After acquiring the information for guiding the sightline, the display controller 31 estimates perspective coordinates P(x, y) on the front windshield 8 that the sightline of the vehicle occupant M passes when the vehicle occupant M looks at a point of braking distance (step ST31).

Lane lines 61 for guiding the sightline of the vehicle occupant M are displayed at the perspective coordinates P(x, y) so that the sightline of the vehicle occupant M can be guided to the aforementioned direction or point. The following description relates to an example where the sightline of the vehicle occupant M is guided toward the predicted path. In the vehicle-window image IM in FIG. 4, the road extends straight in the forward direction ahead of the vehicle body 2. In this case, as indicated by the dotted-line frame in FIG. 4, the vehicle occupant M needs to visually check the condition of the surface of the road serving as the path of the automobile 1.

In the estimation process of the perspective coordinates P(x, y) of the sightline toward the guidance point, the display controller 31 first specifies a coordinate range, which is the predicted path (i.e., the current lane), in the vehicle-window image IM (step ST32).

For instance, by using the guidance route data and the link data in the road data, the display controller 31 specifies an image-captured coordinate range obtaining by capturing an image of the road serving as the predicted path in the vehicle-window image IM. For instance, in the case of the vehicle-window image IM in FIG. 4, the hatched image-captured range of the straight road in FIG. 5 becomes the image-captured coordinate range of the road serving as the predicted path.

If it is determined based on the road data that the road is a two-lane road or that the road is a four-lane road with two lanes on each side, the image-captured range of the lane on which the vehicle travels may be set as the image-captured coordinate range acting as the predicted path.

Furthermore, if a white lane line or yellow lane line that divides the road for each lane is recognizable as a result of the process executed on the vehicle-window image IM, the image-captured range of the lane on which the vehicle travels may be specified based on this information.

Subsequently, the display controller 31 estimates a braking distance (step ST33).

For instance, the display-controller 31 acquires vehicle-speed information from the ECU 25 and calculates the braking distance in accordance with the type of the road surface on which the vehicle is traveling, such as a paved road or a gravel road.

The display controller 31 may alternatively calculate the braking distance in accordance with, for instance, the weather. Sunny weather or rainy weather may be acquired by the wireless communication unit 28 or may be determined based on rain noise or brightness in the image obtained by the front camera 21.

Then, if the vehicle is traveling at, for instance, 60 km/h, the display controller 31 specifies a substantially central position of the dotted-line frame in FIG. 4, which serves as a point of braking distance at that speed, as the visual-field center coordinates PC, as illustrated in FIG. 5 (step ST34).

After specifying the visual-field center coordinates PC in the vehicle-window image IM, the display controller 31 specifies a pair of left and right sightline guidance coordinates PL and PR separated from the visual-field center coordinates PC by a distance equivalent to the lane width or the vehicle width (step ST35). Specifically, in the case of the vehicle-window image IM in FIG. 4, the display controller 31 specifies a pair of sightline guidance coordinates PL and PR that are located in the left-right direction (horizontal direction) from the visual-field center coordinates PC in FIG. 5 and that have been obtained by image-capturing the left edge and the right edge of the lane.

The vehicle-width information, the road-width information, and the lane-width information can be acquired from the navigation device 27. The display controller 31 refers to the acquired information and specifies the pair of left and right sightline guidance coordinates PL and PR such that they are separated from each other by a distance larger than or equal to the vehicle width. If the road width or the lane width is smaller than the vehicle width, the pair of sightline guidance coordinates PL and PR are specified by being shifted from the left edge and the right edge of the lane so that the separation distance therebetween becomes larger than or equal to the vehicle width.

Next, the display controller 31 specifies a spatial position of the visual point (origin of the line of vision) of the vehicle occupant M based on an in-vehicle image captured by the in-vehicle camera 23 (step ST36).

In this example, the captured in-vehicle image includes the face of the vehicle occupant M. In this case, by identifying the position of the head or the eyes in the image, the direction of the head or the eyes relative to the in-vehicle camera 23 can be specified. Furthermore, the vehicle occupant M is seated in the seat 6 and is held thereto by the seatbelt 9. Thus, the distance to the head or the eyes from the in-vehicle camera 23 can be estimated from information about the front-rear position of the seat 6, which is slidable. Based on these pieces of information, the display controller 31 specifies the spatial position of the head or the eyes of the boarded vehicle occupant M.

In addition, for instance, in a state where a reference mark aligned with a predetermined object outside the vehicle is displayed, the vehicle occupant M may be made to move his/her head sideways. In a state where the reference mark appears to be aligned with the predetermined object outside the vehicle, an image may be captured and stored as a reference image. Subsequently, based on a difference between the image-captured position of the head or the eyes in the reference image and the image-captured position of the head or the eyes in the in-vehicle image at the time of processing, the spatial position of the head or the eyes of the boarded vehicle occupant M may be specified. Even in this case, the display controller 31 can specify an approximate spatial position of the head or the eyes of the boarded vehicle occupant M.

Next, the display controller 31 calculates perspective coordinates P(x, y) on the front windshield 8 that the sightline of the vehicle occupant M passes when the vehicle occupant M looks at a sightline guidance position through the front windshield 8 (step ST37).

FIG. 6 illustrates an example of a calculation process for obtaining the perspective coordinates P(x, y) on the front windshield 8. FIG. 6 is a schematic cross-sectional view the vehicle body 2 and the road, taken along a vertical plane. In FIG. 6, the road surface, the front camera 21 fixed to the vehicle body 2, the front windshield 8, and the head and the eyes of the vehicle occupant M are illustrated. Moreover, the vehicle-window image IM captured by the front camera 21 is also schematically illustrated. In this case, the vehicle-window image IM can be treated as an imaginary image set at an intersection point between the lower edge of the image-capturing range of the front camera 21 and the road surface ahead of the vehicle body 2.

Under such a spatial positional relationship, the point of braking distance, that is, the spatial position of the sightline guidance point P1 on the road, can be obtained by extending a line segment that connects the front camera 21 and the sightline guidance coordinates PL and PR in the vehicle-window image IM. Then, a line segment that connects the spatial position of the sightline guidance point P1 on the road and the spatial position of the head or the eyes of the vehicle occupant M intersects the front windshield 8. By performing calculation based on this positional relationship, the display controller 31 can calculate the perspective coordinates P(x, y) on the front windshield 8 that the sightline passes when the vehicle occupant M looks at the sightline guidance point P1 through the front windshield 8.

After calculating the perspective coordinates P(x, y) on the front windshield 8, the display controller 31 starts a process for displaying the pair of lane lines 61 side-by-side at the corresponding perspective coordinates P(x, y) (step ST38).

The display controller 31 displays the right lane line 61 extending upward from the right perspective coordinates P(x, y) along the right edge of the lane, and also displays the left lane line 61 extending upward from the left perspective coordinates P(x, y) along the left edge of the lane.

Figure 13:
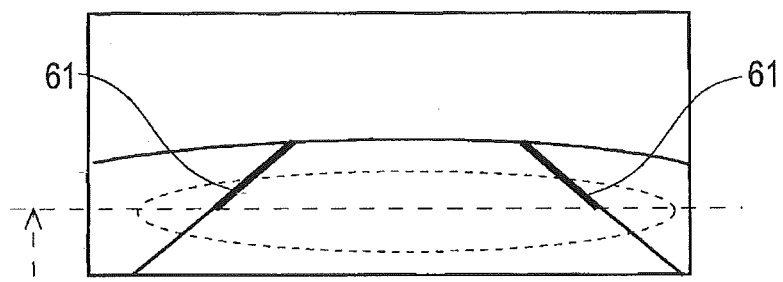
FIG. 13 illustrates an example of vehicle-window scenery viewed through the front windshield by the vehicle occupant.

FIG. 13 illustrates an example of vehicle-window scenery viewed through the front windshield 8 by the vehicle occupant M. In FIG. 13, the pair of lane lines 61 extend upward from the point of braking distance on the left and right edges to which the sightline is desirably guided and are displayed side-by-side in alignment with the left and right edges of the lane on which the vehicle travels. Specifically, the right lane line 61 extends upward from the point of braking distance in alignment with the right edge of the lane. The left lane line 61 extends upward from the point of braking distance in alignment with the left edge of the lane.

With the pair of lane lines 61, the sightline of the vehicle occupant M may be guided to the lane.

Accordingly, in this example, the display controller 31 acquires scenery information regarding the scenery visually recognized by the vehicle occupant M from inside the vehicle. Based on the scenery information, the display controller 31 specifies the perspective coordinates P(x, y) on the front windshield 8 that the sightline of the vehicle occupant M passes when the vehicle occupant M visually recognizes the predicted path along which the vehicle (vehicle body 2) is predicted to travel, or specifies the perspective coordinates P(x, y) where the left and right edges of the predicted path of the vehicle are projected. Then, based on the perspective coordinates P(x, y), the projector 30 displays the pair of lane lines 61 side-by-side on the front windshield 8 such that they respectively extend along the left and right edges and are separated from each other by a distance equivalent to the vehicle width or larger. Thus, the vehicle occupant M can see the pair of lane lines 61 displayed on the front windshield 8 in alignment with the left and right edges of the predicted path of the vehicle. The sightline of the vehicle occupant M may be guided to the predicted path of the vehicle highlighted by the pair of lane lines 61. The vehicle occupant M can check the predicted path, which needs to be checked during driving. The vehicle occupant M can check whether or not he/she can drive safely by checking between the pair of lane lines 61. Furthermore, by displaying the pair of lane lines 61, the sightline of the vehicle occupant M is made stable on the predicted path. As a result, the automobile 1 can travel stably. Moreover, even after the vehicle occupant M moves his/her sightline in another direction, the vehicle occupant M can readily and quickly move his/her sightline back toward the desired predicted path. When moving the sightline back toward the desired predicted path, it is not necessary to search for the predicted path.

In particular, since the pair of lane lines 61 are displayed in alignment with the left and right edges of the predicted path, the line of vision of the vehicle occupant M becomes less likely to be focused on one point, so that the vehicle occupant M can readily observe the entire predicted path. In addition to the predicted path, the left and right sides of the predicted path can also be readily checked. In contrast, for instance, assuming that a single lane line is displayed on the predicted path, the line of vision of the vehicle occupant M tends to become focused on that one line. As a result, even if the sightline of the vehicle occupant M can be guided to the predicted path with the single lane line, the vehicle occupant M becomes consciously focused on that one line, thus making it difficult to observe the entire direction of the predicted path. In particular, it becomes difficult to perform a safety check for the left and right sides of the predicted path, which are slightly distant from the single lane line. In this example, such misleading is less likely to occur.

Furthermore, in this example, the display controller 31 acquires vehicle traveling information regarding traveling of the automobile 1, and the projector 30 displays the pair of lane lines 61 at positions according to the vehicle traveling information. The sightline or the awareness of a person with respect to a linear object tends to be biased toward the ends of the linear object than the center thereof. Therefore, the vehicle occupant M can obtain vehicle traveling information regarding traveling of the vehicle from the end positions of the pair of lane lines 61 without having to move his/her sightline guided by the pair of lane lines 61.

In this example, when the display controller 31 acquires the speed of the automobile 1 as vehicle traveling information, the projector 30 displays the pair of lane lines 61 above perspective coordinates P(x, y) of a stop point corresponding to a predicted braking distance at that speed. Thus, the vehicle occupant M can obtain information about the predicted braking distance of the vehicle from the lower-end positions of the pair of lane lines 61 without having to move his/her sightline guided by the pair of lane lines 61.

FIFTH EXAMPLE

A fifth example to be described below relates to a case where the display positions of the lane lines 61 are changed.

Figure 14:
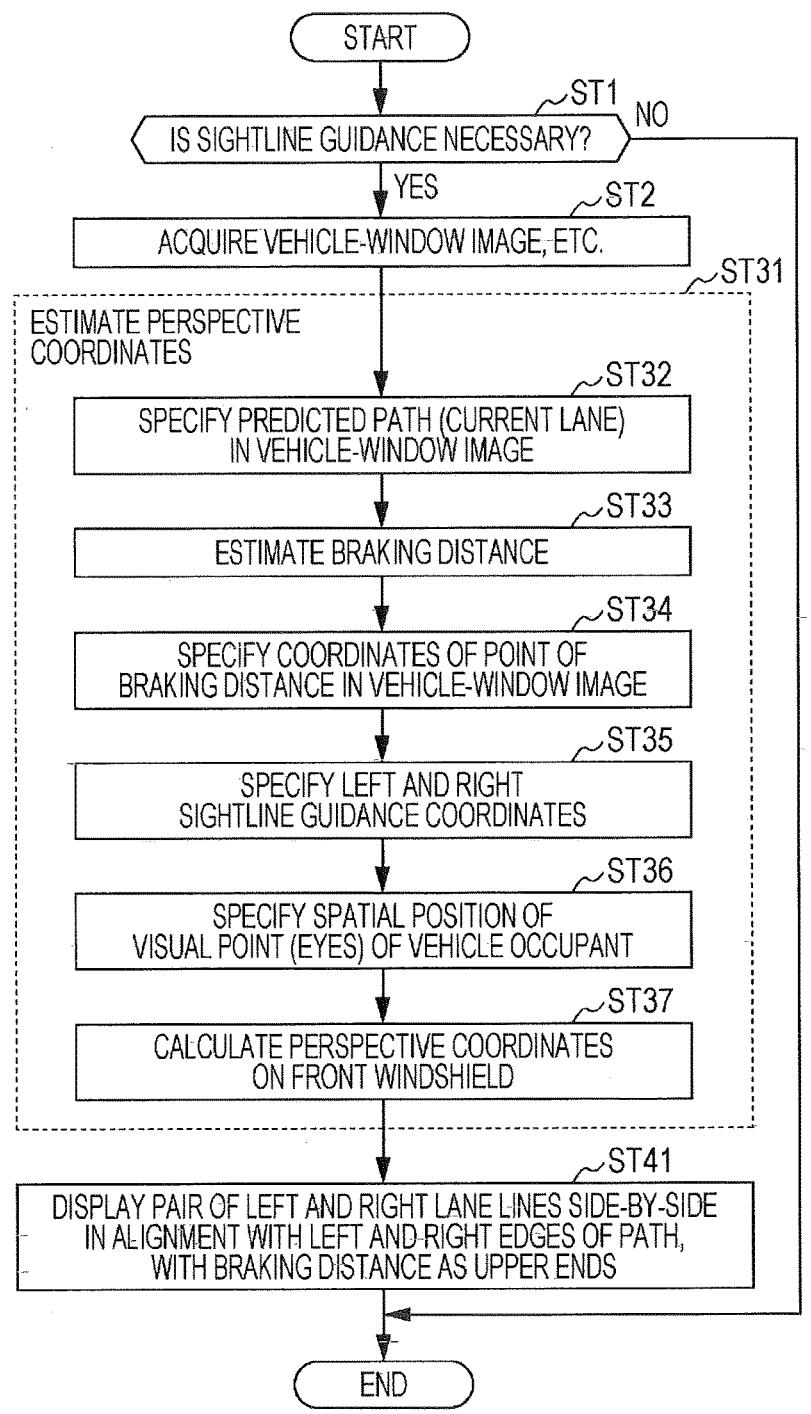
FIG. 14 is a flowchart of a process for changing a pair of lane lines in a fifth example of the present invention.

FIG. 14 is a flowchart of a process for changing the pair of lane lines in the fifth example of the present invention. The display controller 31 executes the process in FIG. 14 in place of the process in FIG. 12.

In FIG. 14, after calculating the perspective coordinates P(x, y) on the front windshield 8 in step ST37, the display controller 31 starts a process for displaying the pair of lane lines 61 side-by-side at the corresponding perspective coordinates P(x, y) (step ST41).

The display controller 31 displays the right lane line 61 extending downward from the right perspective coordinates P(x, y) along the right edge of the lane, and also displays the left lane line 61 extending downward from the right perspective coordinates P(x, y) along the left edge of the lane.

With the pair of lane lines 61, the sightline of the vehicle occupant M may be guided to the lane.

Accordingly, in this example, when the display controller 31 acquires the speed of the automobile 1 as vehicle traveling information, the projector 30 displays the pair of lane lines 61 along the left and right edges of the predicted path below the perspective coordinates P(x, y) of the stop point corresponding to the predicted braking distance at that speed. Thus, the vehicle occupant M can obtain information about the predicted braking distance of the vehicle from the upper-end positions of the pair of lane lines 61 without having to move his/her sightline guided by the pair of lane lines 61. In particular, since the left and right sides of the range up to the predicted braking distance are separated by the pair of lane lines 61, the range that particularly needs caution can be properly identified.

SIXTH EXAMPLE

A sixth example to be described below relates to a case where a pair of lane lines for guiding the sightline of the vehicle occupant M are displayed on the front windshield 8.

The configurations of the automobile 1 and the sightline guidance system 20 in the sixth example are identical to those in the first example, and descriptions thereof will be omitted by using the same reference characters. In the following description, main differences will be described.

Next, an example of a sightline guidance process performed by the sightline guidance system 20 according to the sixth example will be described. The sightline guidance system 20 displays scenery to be desirably viewed by the vehicle occupant M, for instance, a path with lane lines superimposed thereon, so as to guide the sightline of the vehicle occupant M.

Figure 15:
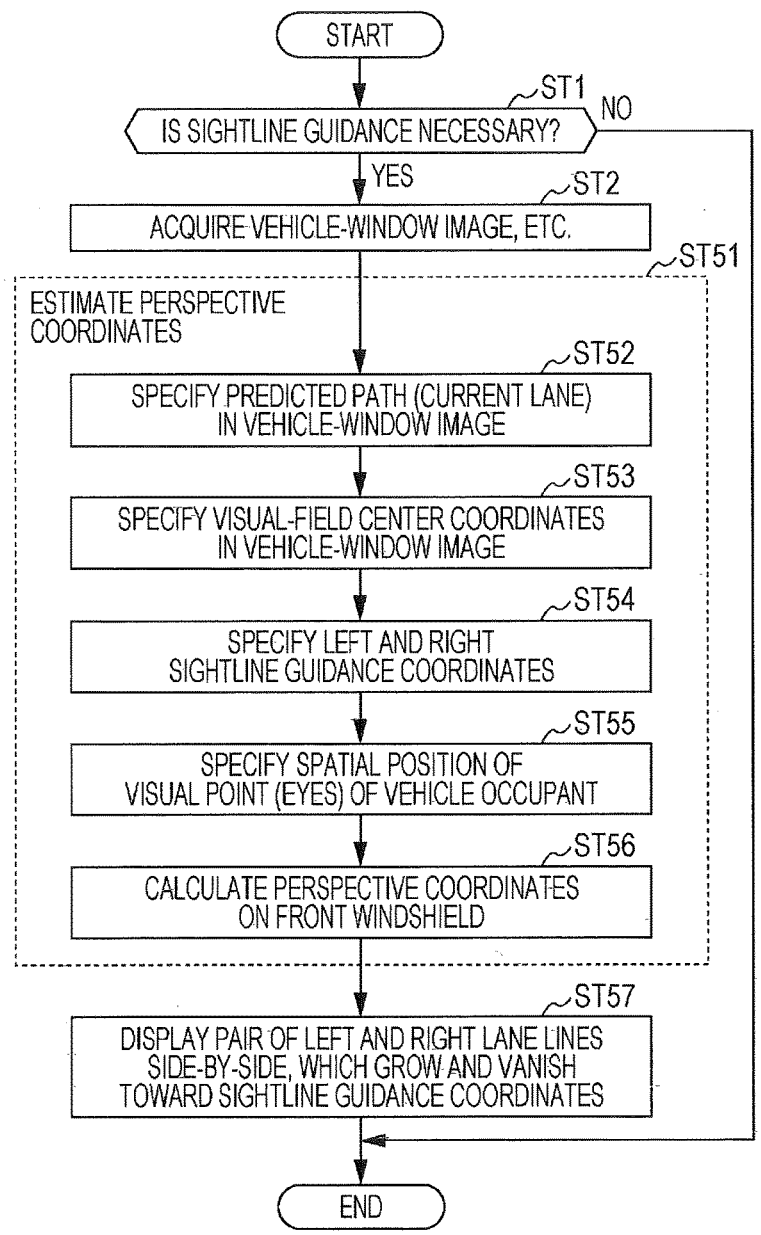
FIG. 15 is a flowchart of a display process periodically executed by the display controller in FIG. 2 according to a sixth example of the present invention.

FIG. 15 is a flowchart of a display process periodically executed by the display controller 31 according to the sixth example. The display controller 31 repeatedly executes the process in FIG. 15, for instance, every 100 milliseconds and updates the display on the front windshield 8.

In order to guide the sightline of the vehicle occupant M, the display controller 31 periodically executes the display process in FIG. 15. First, the display controller 31 determines whether or not the display for guiding the sightline of the vehicle occupant M is necessary (step ST1).

For instance, the display controller 31 measures unstable behavior of the vehicle body 2 or the stress level of the vehicle occupant M and converts it into a numerical value. If the value exceeds a certain level, the display controller 31 determines that the sightline guidance display is necessary.

Furthermore, if there is a change in the driving environment, such as a sharp turn or sudden intrusion of another vehicle body 2, the display controller 31 determines that the sightline guidance display is necessary.

Furthermore, the display controller 31 may determine the most recent movement of the sightline of the vehicle occupant M and may determine that the sightline guidance display is necessary if, for instance, there is an unwary moving object.

In other cases, the display controller 31 determines that the sightline guidance display is not necessary and ends the display process in FIG. 15.

The display controller 31 may determine whether or not the sightline guidance display is necessary immediately before a display process to be described later.

If the display controller 31 determines that the sightline guidance display is necessary, the display controller 31 proceeds with the display process in FIG. 15 and acquires information for guiding the sightline (step ST2).

The information acquired in this process includes, for instance, an image ahead of the vehicle body 2 captured by the front camera 21, which can be used as a front vehicle-window image IM, and an in-vehicle image captured by the in-vehicle camera 23, which can be used for determining the sightline of the vehicle occupant M.

After acquiring the information for guiding the sightline, the display controller 31 estimates perspective coordinates P(x, y) on the front windshield 8 that the sightline of the vehicle occupant M passes when the vehicle occupant M looks at a sightline point to which the sightline of the vehicle occupant M is desirably guided (step ST51).

Lane lines 71 for guiding the sightline of the vehicle occupant M are displayed at the perspective coordinates P(x, y) so that the sightline of the vehicle occupant M can be guided to the aforementioned direction or point. The following description relates to an example where the sightline of the vehicle occupant M is guided toward the predicted path. In the vehicle-window image IM in FIG. 4, the road extends straight in the forward direction ahead of the vehicle body 2. In this case, as indicated by the dotted-line frame in FIG. 4, the vehicle occupant M needs to visually check the condition of the surface of the road serving as the path of the automobile 1.

In the estimation process of the perspective coordinates P(x, y) of the sightline toward the guidance point, the display controller 31 first specifies a coordinate range, which is the predicted path (i.e., the current lane), in the vehicle-window image IM (step ST52).

For instance, by using the guidance route data and the link data in the road data, the display controller 31 specifies an image-captured coordinate range obtaining by capturing an image of the road serving as the predicted path in the vehicle-window image IM. For instance, in the case of the vehicle-window image IM in FIG. 4, the hatched image-captured range of the straight road in FIG. 5 becomes the image-captured coordinate range of the road serving as the predicted path.

If it is determined based on the road data that the road is a two-lane road or that the road is a four-lane road with two lanes on each side, the image-captured range of the lane on which the vehicle travels may be set as the image-captured coordinate range acting as the predicted path.

Furthermore, if a white lane line or yellow lane line that divides the road for each lane is recognizable as a result of the process executed on the vehicle-window image IM, the image-captured range of the lane on which the vehicle travels may be specified based on this information.

After specifying the image-captured coordinate range acting as the predicted path (i.e., the current lane), the display controller 31 specifies visual-field center coordinates PC, at which the entire road surface of the predicted path can be viewed, in the vehicle-window image IM (step ST53).

The display controller 31 specifies, for instance, a central position of a predetermined distance on the predicted path as the visual-field center coordinates PC. In the case of the vehicle-window image IM in FIG. 4, for instance, the center of the dotted-line frame in FIG. 4 is specified as the visual-field center coordinates PC, as illustrated in FIG. 5.

After specifying the visual-field center coordinates PC in the vehicle-window image IM, the display controller 31 specifies a pair of left and right sightline guidance coordinates PL and PR separated from the visual-field center coordinates PC by a distance equivalent to the lane width or the vehicle width (step ST54). Specifically, in the case of the vehicle-window image IM in FIG. 4, the display controller 31 specifies a pair of sightline guidance coordinates PL and PR that are located in the left-right direction (horizontal direction) from the coordinates PC corresponding to the point of predetermined distance in FIG. 5 and that have been obtained by image-capturing the left edge and the right edge of the lane.

The vehicle-width information, the road-width information, and the lane-width information can be acquired from the navigation device 27. The display controller 31 refers to the acquired information and specifies the pair of left and right sightline guidance coordinates PL and PR such that they are separated from each other by a distance larger than or equal to the vehicle width. If the road width or the lane width is smaller than the vehicle width, the pair of sightline guidance coordinates PL and PR are specified by being shifted from the left edge and the right edge of the lane so that the separation distance therebetween becomes larger than or equal to the vehicle width.

Next, the display controller 31 specifies a spatial position of the visual point (origin of the line of vision) of the vehicle occupant M based on an in-vehicle image captured by the in-vehicle camera 23 (step ST55).

In this example, the captured in-vehicle image includes the face of the vehicle occupant M. In this case, by identifying the position of the head or the eyes in the image, the direction of the head or the eyes relative to the in-vehicle camera 23 can be specified. Furthermore, the vehicle occupant M is seated in the seat 6 and is held thereto by the seatbelt 9. Thus, the distance to the head or the eyes from the in-vehicle camera 23 can be estimated from information about the front-rear position of the seat 6, which is slidable. Based on these pieces of information, the display controller 31 specifies the spatial position of the head or the eyes of the boarded vehicle occupant M.

In addition, for instance, in a state where a reference mark aligned with a predetermined object outside the vehicle is displayed, the vehicle occupant M may be made to move his/her head sideways. In a state where the reference mark appears to be aligned with the predetermined object outside the vehicle, an image may be captured and stored as a reference image. Subsequently, based on a difference between the image-captured position of the head or the eyes in the reference image and the image-captured position of the head or the eyes in the in-vehicle image at the time of processing, the spatial position of the head or the eyes of the boarded vehicle occupant M may be specified. Even in this case, the display controller 31 can specify an approximate spatial position of the head or the eyes of the boarded vehicle occupant M.

Next, the display controller 31 calculates perspective coordinates P(x, y) on the front windshield 8 that the sightline of the vehicle occupant M passes when the vehicle occupant M looks at a sightline guidance position through the front windshield 8 (step ST56).

FIG. 6 illustrates an example of a calculation process for obtaining the perspective coordinates P(x, y) on the front windshield 8. FIG. 6 is a schematic cross-sectional view the vehicle body 2 and the road, taken along a vertical plane. In FIG. 6, the road surface, the front camera 21 fixed to the vehicle-body 2, the front windshield 8, and the head and the eyes of the vehicle occupant M are illustrated. Moreover, the vehicle-window image IM captured by the front camera 21 is also schematically illustrated. In this case, the vehicle-window image IM can be treated as an imaginary image set at an intersection point between the lower edge of the image-capturing range of the front camera 21 and the road surface ahead of the vehicle body 2.

Under such a spatial positional relationship, the point of visual-field center coordinates PC, that is, the spatial position of the sightline guidance point P1 on the road, can be obtained by extending a line segment that connects the front camera 21 and the sightline guidance coordinates PL and PR in the vehicle-window image IM. Then, a line segment that connects the spatial position of the sightline guidance point P1 on the road and the spatial position of the head or the eyes of the vehicle occupant M intersects the front windshield 8. By performing calculation based on this positional relationship, the display controller 31 can calculate the perspective coordinates P(x, y) on the front windshield 8 that the sightline passes when the vehicle occupant M looks at the sightline guidance point P1 through the front windshield 8.

After calculating the perspective coordinates P(x, y) on the front windshield 8, the display controller 31 starts a process for displaying the pair of lane lines 71 side-by-side at the corresponding perspective coordinates P(x, y).

The display controller 31 displays the right lane line 71 at the right perspective coordinates P(x, y) and the left lane line 71 at the left perspective coordinates P(x, y) (step ST57).

FIGS. 16A to 16D illustrate an example of vehicle-window scenery viewed through the front windshield 8 by the vehicle occupant M. In FIGS. 16A to 16D, the lane lines 71 develop and vanish toward the perspective coordinates P(x, y) as a result of a display updating process executed by the display controller 31.

Figure 16A:
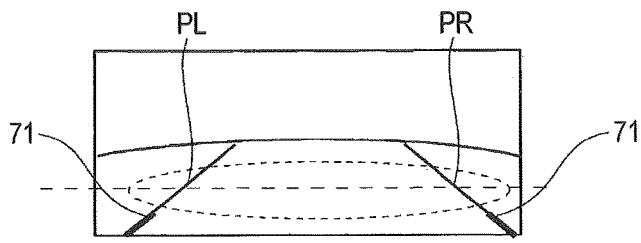
FIGS. 16A to 16D illustrate an example of vehicle-window scenery, in which lane lines develop and vanish, viewed through the front windshield by the vehicle occupant.

In an initial display in FIG. 16A, the pair of lane lines 71 are displayed side-by-side at a lower section of the front windshield 8 in alignment with the left and right edges of the lane on-which the vehicle travels.

Figure 16B:
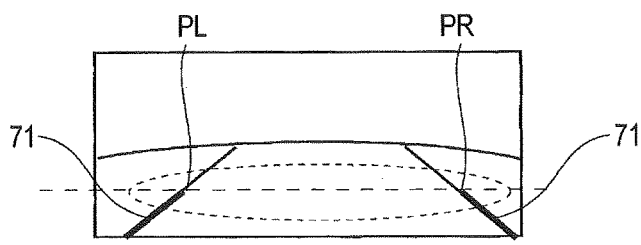

Subsequently, as illustrated in FIG. 16B, the pair of lane lines 71 develop upward along the left and right edges of the lane so that the upper ends thereof reach the left and right perspective coordinates P(x, y).

Figure 16C:
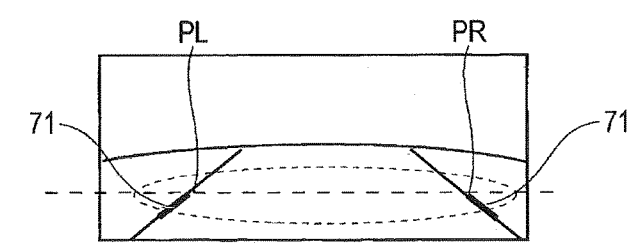

Then, as illustrated in FIG. 16C, the lower ends of the pair of lane lines 71 move upward along the left and right edges of the lane.

Figure 16D:
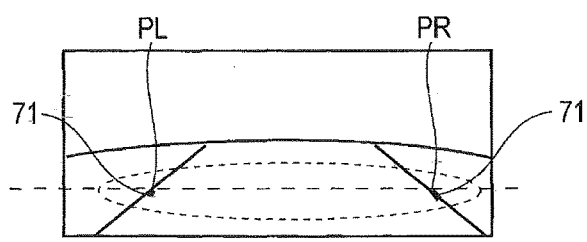

Subsequently, as illustrated in FIG. 16D, the pair of lane lines 71 vanish at the left and right perspective coordinates P(x, y).

With the pair of lane lines 71 developing and vanishing toward the left and right perspective coordinates P(x, y), the sightline of the vehicle occupant M may be guided to the left and right perspective coordinates P(x, y). Furthermore, with the pair of lane lines 71, the vehicle occupant M can visually recognize the spatial position of the right edge of the lane and the spatial position of the left edge of the lane. Moreover, since the pair of lane lines 71 appear to be aligned with the left and right edges of the lane, the vehicle occupant M can recognize that the lane width is larger than or equal to the vehicle width of the vehicle body 2.

Accordingly, in this example, the display controller 31 acquires scenery information regarding the scenery visually recognized by the vehicle occupant M from inside the vehicle. Based on the scenery information, the display controller 31 specifies the perspective coordinates P(x, y) on the front windshield 8 that the sightline of the vehicle occupant M passes when the vehicle occupant M visually recognizes the predicted path along which the vehicle (vehicle body 2) is predicted to travel, or specifies the perspective coordinates P(x, y) where the left and right edges of the predicted path of the vehicle are projected. Then, based on the perspective coordinates P(x, y), the projector 30 displays the pair of lane lines 71 side-by-side on the front windshield 8 such that they respectively extend along the left and right edges and are separated from each other by a distance equivalent to the vehicle width or larger. Thus, the vehicle occupant M can see the pair of lane lines 71 displayed on the front windshield 8 in alignment with the left and right edges of the predicted path of the vehicle. The sightline of the vehicle occupant M may be guided to the predicted path of the vehicle highlighted by the pair of lane lines 71. The vehicle occupant M can check the predicted path, which needs to be checked during driving. The vehicle occupant M can check whether or not he/she can drive safely by checking between the pair of lane lines 71. Furthermore, by displaying the pair of lane lines 71, the sightline of the vehicle occupant M is made stable on the predicted path. As a result, the automobile 1 can travel stably. Moreover, even after the vehicle occupant M moves his/her sightline in another direction, the vehicle occupant M can readily and quickly move his/her sightline back toward the desired predicted path. When moving the sightline back toward the desired predicted path, it is not necessary to search for the predicted path.

In particular, since the pair of lane lines 71 are displayed in alignment with the left and right edges of the predicted path, the line of vision of the vehicle occupant M becomes less likely to be focused on one point, so that the vehicle occupant M can readily observe the entire predicted path. In addition to the predicted path, the left and right sides of the predicted path can also be readily checked.

In contrast, for instance, assuming that a single lane line is displayed on the predicted path, the line of vision of the vehicle occupant M tends to become focused on that one line. As a result, even if the sightline of the vehicle occupant M can be guided to the predicted path with the single lane line, the vehicle occupant M becomes consciously focused on that one line, thus making it difficult to observe the entire direction of the predicted path. In particular, it becomes difficult to perform a safety check for the left and right sides of the predicted path, which are slightly distant from the single lane line. In this example, such misleading is less likely to occur.

Furthermore, in this example, the projector 30 changes the display on the front windshield 8 including the pair of lane lines 71 in accordance with elapsed time after the display. Therefore, since the pair of lane lines 71 located ahead of the sightline changes with time, the sightline or the awareness of the vehicle occupant M can be guided more finely without making the vehicle occupant M move his/her sightline guided by the pair of lane lines 71.

Furthermore, in this example, the projector 30 causes the pair of lane lines 71 to develop and vanish toward the perspective coordinates P(x, y) in accordance with elapsed time. Therefore, the line of vision of the vehicle occupant M is guided in the direction in which the pair of lane lines 71 develop and vanish or to the coordinates at which the pair of lane lines 71 develop or vanish. The sightline guidance effect with respect to the perspective coordinates P(x, y) can be enhanced.

SEVENTH EXAMPLE

A seventh example to be described below relates to a case where moving marks that move along the pair of lane lines 71 are displayed on the front windshield 8 together with the pair of lane lines 71.

The configurations of the automobile 1 and the sightline guidance system 20 in the seventh example are identical to those in the sixth example, and descriptions thereof will be omitted by using the same reference characters. In the following description, main differences will be described.

Figure 17:
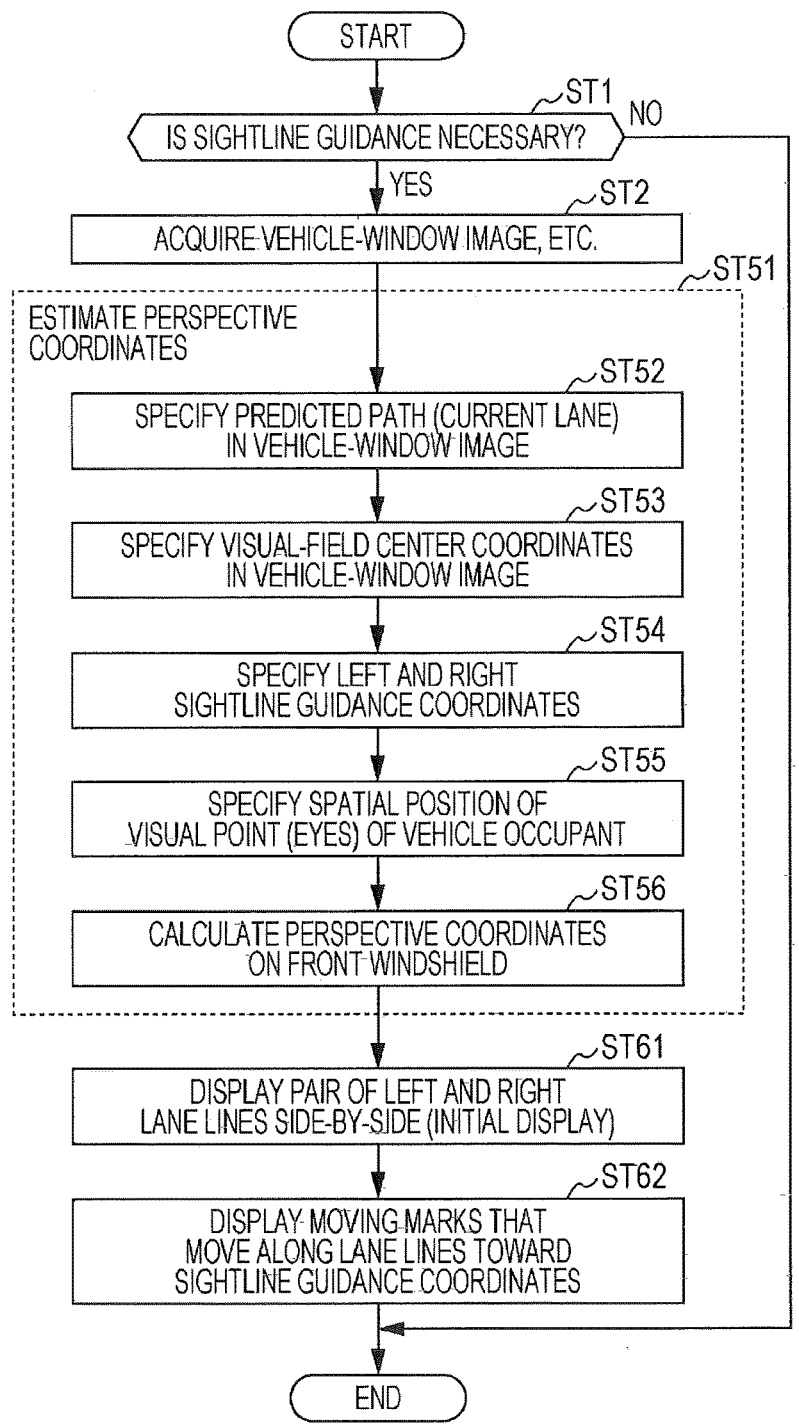
FIG. 17 is a flowchart of a display process periodically executed by the display controller according to a seventh example of the present invention.

FIG. 17 is a flowchart of a display process periodically executed by the display controller 31 according to the seventh example of the present invention.

FIGS. 18A to 18E illustrate an example of vehicle-window scenery, in which the moving marks move along the lane lines, viewed through the front windshield 8 by the vehicle occupant M. In FIG. 1-8A, the pair of lane lines 71 are displayed. In FIGS. 18B to 18E, a plurality of moving marks 72 move along the pair of lane lines 71 toward the left and right perspective coordinates P(x, y).

As illustrated in FIG. 17, after calculating perspective coordinates P(x, y) on the front windshield 8 that the sightline passes in step ST56, the display controller 31 starts the display process.

Figure 18A:
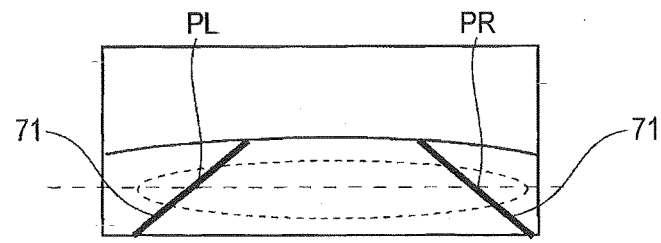
FIGS. 18A to 18E illustrate an example of vehicle-window scenery, in which moving marks move along the lane lines, viewed through the front windshield by the vehicle occupant.
Figure 18B:
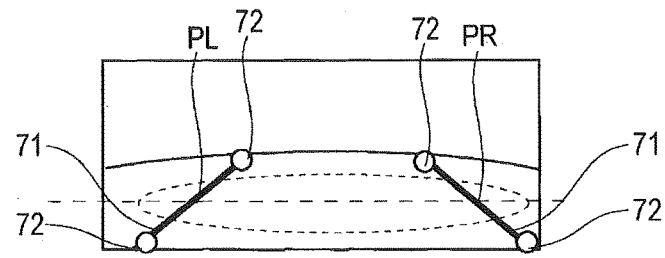
Figure 18C:
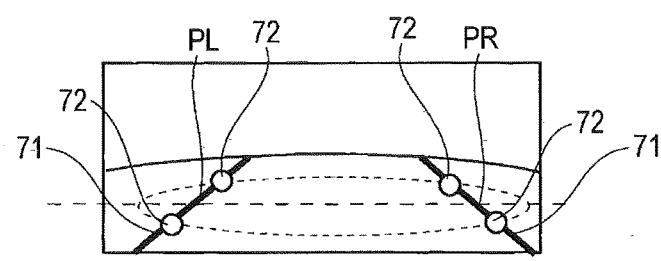
Figure 18D:
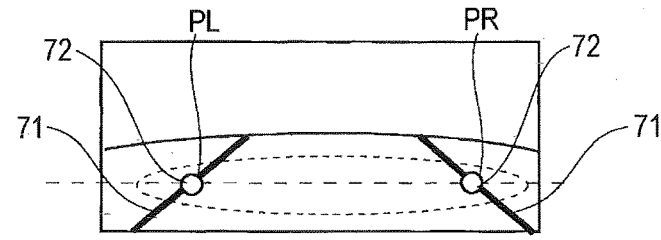
Figure 18E:
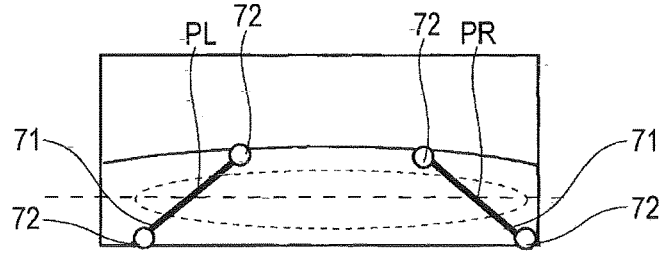

As illustrated in FIG. 18A, in the display process, the display controller 31 first displays the pair of lane lines 71 side-by-side at the corresponding calculated perspective coordinates P(x, y) (step ST61).

The pair of lane lines 71 are displayed so as to extend along the left and right edges of the predicted path in alignment with the left and right edges of the predicted path. Thus, the sightline is guided to the road surface and the surroundings of the predicted path.

After displaying the pair of lane lines 71, the display controller 31 further displays the moving marks 72 that move along the pair of lane lines 71 (step ST62).

In FIGS. 18B to 18E, after the plurality of moving marks 72 are displayed at ends of the pair of lane lines 71, the moving marks 72 move along the pair of lane lines 71 toward the left and right sightline guidance coordinates PL and PR. Then, the moving marks 72 vanish at the left and right sightline guidance coordinates PL and PR. Subsequently, new moving marks 72 are displayed again at the ends of the pair of lane lines 71 and move. The moving marks 72 move repeatedly along the pair of lane lines 71.

Accordingly, in this example, the projector 30 displays the moving marks 72, which move along the lane lines 71 in accordance with elapsed time, together with the visually-recognized lane lines 71 extending along one side of the left and right edges of the predicted path of the vehicle. Therefore, the line of vision of the vehicle occupant M is guided in the direction in which the moving marks 72 move along the lane lines 71. The sightline can be guided in the moving direction of the moving marks 72. The sightline can be guided to target positions, such as the left and right sightline guidance coordinates PL and PR.

Figure 19A:
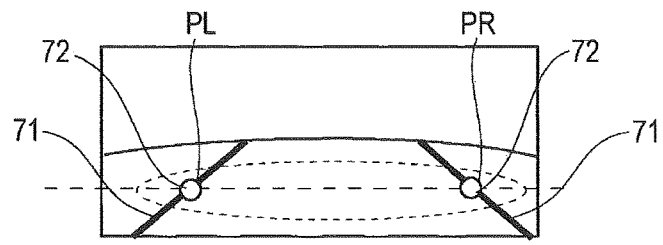
FIGS. 19A to 19C illustrate a modification of vehicle-window scenery, in which the moving marks move away from the lane lines, viewed through the front windshield by the vehicle occupant.
Figure 19B:
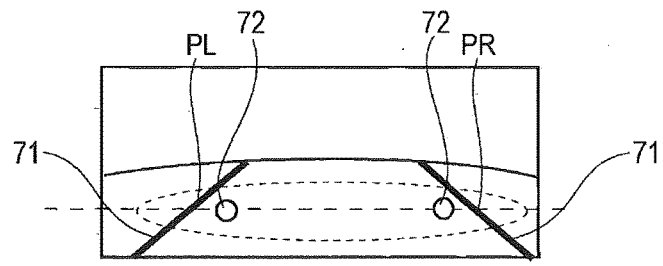
Figure 19C:
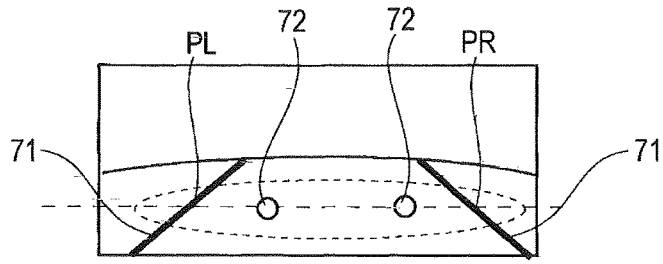

FIGS. 19A to 19C illustrate a modification of vehicle-window scenery, in which the moving marks 72 move away from the lane lines 71, viewed through the front windshield 8 by the vehicle occupant M.

In the modification in FIGS. 19A to 19C, after the moving marks 72 are displayed at the left and right sightline guidance coordinates PL and PR, the moving marks 72 move inward toward the center between the pair of lane lines 71. Then, the moving marks 72 vanish at the center between the pair of lane lines 71. Even in this modification, the projector 30 displays the moving marks 72, which move toward and away from the lane lines 71 in accordance with elapsed time, together with the visually-recognized lane lines 71 extending along one side of the left and right edges of the predicted path of the vehicle. Therefore, the line of vision of the vehicle occupant M is guided in the direction in which the moving marks 72 move toward and away from the lane lines 71. The sightline can be guided in the moving direction of the moving marks 72. The sightline can be guided to a target position.

The examples described above are preferred examples of the present invention. However, the present invention is not limited to these examples, and various modifications and alterations are possible so long as they do not depart from the scope of the invention.

For instance, in the above examples, the projector 30 projects an image onto the front windshield 8. Alternatively, for instance, the projector 30 may display the image on a see-through screen that is installed between the front windshield 8 and the vehicle occupant M and that is used by the vehicle occupant M who has boarded the vehicle body 2 to visually recognize the outside of the vehicle. As another alternative, the image may be displayed on a glass screen of a pair of glasses worn by the vehicle occupant M.

In the above examples, the display controller 31 uses a captured image of vehicle-window scenery as scenery information. Alternatively, the scenery information may be obtained from information from the navigation device 27 or information acquired by the wireless communication unit 28.

In the above examples, a guidance path is used as a predicted path. Alternatively, for instance, a road displayed in the vehicle-window image IM may be used as the predicted path. As another alternative, the predicted path may be predicted based on information acquired by the wireless communication unit 28.

In the above examples, the pair of driving reference marks 41 or the pair of lane lines 61 or 71 are basically displayed with a separation distance equivalent to the lane width and are displayed with a separation distance equivalent to the vehicle width where necessary. Alternatively, the pair of driving reference marks 41 or the pair of lane lines 61 or 71 may constantly be displayed with a separation distance equivalent to the vehicle width.

In the above examples, the caution line 42 is displayed at a different position and a different timing with respect to the pair of driving reference marks 41. Alternatively, the caution line 42 may either be displayed at a different position from the pair of driving reference marks 41 or be displayed at a different timing from the pair of driving reference marks 41. In particular, by giving the driving reference marks 41 and the caution line 42 different colors, the vehicle occupant M can distinguish them from each other.

In the above examples, a single caution line 42 is displayed. Alternatively, for instance, a plurality of caution lines 42 may be displayed.

The above examples of the present invention are applied to the automobile 1. In addition to an automobile, the vehicle includes a two-wheeled vehicle and an electric train that runs on rails. The above examples of the present invention are applicable to these vehicles.

The invention claimed is:

1. A vehicle sightline guidance apparatus comprising:
   a display member that displays an image on either one of a see-through front windshield and a see-through screen that allow a vehicle occupant who has boarded a vehicle to visually recognize outside of the vehicle;
   a scenery-information acquiring unit that acquires scenery information about scenery visually recognized by the vehicle occupant from inside the vehicle; and
   a perspective-position specifying unit that specifies perspective positions based on the scenery information of the front windshield and the screen that sightlines pass when the vehicle occupant visually recognizes a predicted path on which the vehicle is predicted to travel,
   wherein the display member displays a pair of driving reference marks side-by-side on either one of the front windshield and the screen such that:
      the pair of driving reference marks are separated from each other by a distance equivalent to a vehicle width of the vehicle or larger,
      the pair of driving reference marks appear to be overlapped with a part of the left edge and a part of the right edge of the predicted path of the vehicle of a whole of the left edge and a whole of the right edge, at the perspective positions,
   wherein the display member changes display of either one of the front windshield and the screen including a pair of lane arks in accordance with elapsed time after the display, and
   wherein the display member causes each of the pair of lane marks to move toward each of the perspectives positions in accordance with the elapsed time.

2. The vehicle sightline guidance apparatus according to claim 1,
   wherein the perspective-position specifying unit specifies a perspective position of an edge of either one of a road and a lane on which the vehicle travels in the scenery information, and
   wherein the display member displays the driving reference marks at the perspective position of the edge of either one of the road and the lane.

3. The vehicle sightline guidance apparatus according to claim 1,
   wherein the display member displays a caution line indicating a caution point for driving the vehicle on either one of the front windshield and the screen at a different timing from the pair of driving reference marks and at a position where the caution line does not overlap the pair of driving reference marks.

4. The vehicle sightline guidance apparatus according to claim 2,
wherein the display member displays a caution line indicating a caution point for driving the vehicle on either one of the front windshield and the screen at a different timing from the pair of driving reference marks and at a position where the caution line does not overlap the pair of driving reference marks.

5. The vehicle sightline guidance apparatus according to claim 1, further comprising:
a relevant-information acquiring unit that acquires relevant information about either one of a risk in a surrounding of the vehicle and traveling of the vehicle,
wherein the display member changes display of the pair of driving reference marks in accordance with the relevant information.

6. The vehicle sightline guidance apparatus according to claim 2, further comprising:
a relevant-information acquiring unit that acquires relevant information about either one of a risk in a surrounding of the vehicle and traveling of the vehicle,
wherein the display member changes display of the pair of driving reference marks in accordance with the relevant information.

7. The vehicle sightline guidance apparatus according to claim 3, further comprising:
a relevant-information acquiring unit that acquires relevant information about either one of a risk in a surrounding of the vehicle and traveling of the vehicle,
wherein the display member changes display of the pair of driving reference marks in accordance with the relevant information.

8. The vehicle sightline: guidance apparatus according to claim 4, further comprising:
a relevant-information acquiring unit that acquires relevant information about either one of a risk in a surrounding of the vehicle and traveling of the vehicle,
wherein the display member changes display of the pair of driving reference marks in accordance with the relevant information.

9. The vehicle sightline guidance apparatus according to claim 1,
wherein the pair of driving reference marks displayed by the display member include a pair of driving reference lines displayed side-by-side along the left edge and the right edge and a pair of sightline reference lines extending outward from the pair of driving reference lines, the pair of driving reference lines being separated from each other by a distance equivalent to the vehicle width of the vehicle or larger.

10. The vehicle sightline guidance apparatus according to claim 9,
wherein the sightline reference lines extending outward from the pair of driving reference lines are longer than the driving reference lines.

11. A vehicle sightline guidance apparatus comprising:
a display member that displays an image on either one of a see-through front windshield and a see-through screen that allow a vehicle occupant who has boarded a vehicle to visually recognize outside of the vehicle;
a scenery-information acquiring unit that acquires scenery information about scenery visually recognized by the vehicle occupant from inside the vehicle; and
a perspective-position specie mg unit that specifies a perspective position based on the scenery information, the perspective position being either one of a first perspective position on either one of the front windshield and the screen that a sightline passes when the vehicle occupant visually recognizes a predicted path on which the vehicle is predicted to travel and a second perspective position where a left edge and a right edge of the predicted path of the vehicle are projected,
wherein based on the perspective position, the display member displays a pair of driving reference marks side-by-side on either one of the front windshield and the screen such that the pair of driving reference marks are separated from each other by a distance equivalent to a vehicle width of the vehicle or larger and appear to be aligned with the left edge and the right edge of the predicted path of the vehicle,
wherein the pair of driving reference marks displayed by the display member include a pair of driving reference lines displayed side-by-side along the left edge and the right edge and a pair of sightline reference lines extending outward from the pair of driving reference lines, the pair of driving reference lines being separated from each other by a distance equivalent to the vehicle width of the vehicle or larger,
wherein the sightline reference lines extending outward from the pair of driving reference lines are longer than the driving reference lines, and
wherein the display member displays the pair of driving reference lines at a height to which the sightline of the vehicle occupant is desirably guided.

12. The vehicle sightline guidance apparatus according to claim 10,
wherein the display member displays the pair of driving reference lines at a height to which the sightline of the vehicle occupant is desirably guided.

13. The vehicle sightline guidance apparatus according to claim 1,
wherein the pair of lane lines are displayed at positions according to vehicle traveling information.

14. The vehicle sightline guidance apparatus according to claim 13,
wherein when a vehicle-traveling-information acquiring unit acquires a speed of the vehicle as the vehicle traveling information, the display member displays the pair of lane lines above a perspective position of a stop position corresponding to a predicted braking distance at the speed.

15. The vehicle sightline guidance apparatus according to claim 13,
wherein when a vehicle-traveling-information acquiring unit acquires a speed of the vehicle as the vehicle traveling information, the display member displays the pair of lane lines below a perspective position of a stop position corresponding to a predicted braking distance at the speed.

16. The vehicle sightline guidance apparatus according to claim 1,
wherein the display member causes each of the pair of lane marks to vanish or to develop toward each of the perspective positions in accordance with the elapsed time.

17. A vehicle sightline guidance apparatus comprising:
a display member that displays an image on either one of a see-through front windshield and a see-through screen that allow a vehicle occupant who has boarded a vehicle to visually recognize outside of the vehicle;
a scenery-information acquiring unit that acquires scenery information about scenery visually recognized by the vehicle occupant from inside the vehicle; and a perspective-position specifying unit that specifies a perspective position based on the scenery information, the perspective position being either one of a first perspective position on either one of the front windshield and the screen that a sightline passes when the vehicle occupant visually recognizes a predicted path on which the vehicle is predicted to travel and a second perspective position where a left edge and a right edge of the predicted path of the vehicle are projected, wherein based on the perspective position, the display member displays a pair of driving reference marks side-by-side on either one of the front windshield and the screen such that the pair of driving reference marks are separated from each other by a distance equivalent to a vehicle width of the vehicle or larger and appear to be aligned with the left edge and the right edge of the predicted path of the vehicle, wherein the pair of driving reference marks displayed by the display member include a pair of lane lines displayed side-by-side on either one of the front windshield and the screen along the left edge and the right edge of the predicted path of the vehicle such that the pair of lane lines are separated from each other by a distance equivalent to the vehicle width of the vehicle or larger and appear to extend along the left edge and the right edge, wherein the display member changes display of either one of the front windshield and the screen including the pair of lane lines in accordance with elapsed time after the display, and wherein the display member causes the pair of lane lines to vanish or develop toward a center of a visual field in accordance with the elapsed time.

18. A vehicle sightline guidance apparatus comprising:
a display member that displays an image on either one of a see-through front windshield and a see-through screen that allow a vehicle occupant who has boarded a vehicle to visually recognize outside of the vehicle;
a scenery-information acquiring unit that acquires scenery information about scenery visually recognized by the vehicle occupant from inside the vehicle; and
a perspective-position specifying unit that specifies a perspective position based on the scenery information, the perspective position being either one of a first perspective position on either one of the front windshield and the screen that a sightline passes when the vehicle occupant visually recognizes a predicted path on which the vehicle is predicted to travel and a second perspective position where a left edge and a right edge of the predicted path of the vehicle are projected, wherein based on the perspective position, the display member displays a pair of driving reference marks side-by-side on either one of the front windshield and the screen such that the pair of driving reference marks are separated from each other by a distance equivalent to a vehicle width of the vehicle or larger and appear to be aligned with the left edge and the right edge of the predicted path of the vehicle wherein the pair of driving reference marks displayed by the display member include a pair of lane lines displayed side-by-side on either one of the front windshield and the screen along the left edge and the right edge of the predicted path of the vehicle such that the pair of lane lines are separated from each other by a distance equivalent to the vehicle width of the vehicle or larger and appear to extend along the left edge and the right edge, wherein the display member changes display of either one of the front windshield and the screen including the pair of lane lines in accordance with elapsed time after the display, and wherein the display member displays a moving mark, which moves along the lane lines or moves toward and away from the lane lines in accordance with the elapsed time, together with the lane lines that respectively extend along the left edge and the right edge of the predicted path of the vehicle and are visually recognized.

19. The vehicle sightline guidance apparatus according to claim 1,
wherein the display member causes each of the pair of lane marks to
appear to be overlapped with the part of the left edge and the part of the right edge at the perspective positions, after the elapsed time.

20. A vehicle sightline guidance apparatus comprising:
a display member that displays an image on either one of a see-through front windshield and a see-through screen that allow a vehicle occupant who has boarded a vehicle to visually recognize outside of the vehicle;
a scenery-information acquiring unit that acquires scenery information about scenery visually recognized by the vehicle occupant from inside the vehicle; and
a perspective-position specifying unit that specifies perspective positions based on the scenery information of the front windshield and the screen that sightlines pass when the vehicle occupant visually recognizes a predicted path on which the vehicle is predicted to travel,
wherein the display member displays a pair of driving reference marks side-by-side on either one of the front windshield and the screen such that:
the pair of driving reference marks are separated from each other by a distance equivalent to a vehicle width of the vehicle or larger,
the pair of driving reference marks appear to be overlapped with a part of the left edge and a part of the right edge of the predicted path of the vehicle of a whole of the left edge and a whole of the right edge, at the perspective positions,
wherein the display member changes display of either one of the front windshield and the screen including the pair of lane marks in accordance with elapsed time after the display, and
wherein the display member causes each of the pair of lane marks to vanish or to develop toward each of the perspective positions in accordance with the elapsed time.

* * * * *